United States Patent
Otake

(10) Patent No.: US 9,670,619 B2
(45) Date of Patent: Jun. 6, 2017

(54) CELLULOSIC MATERIAL, CELLULOSIC MEMBER, AND RECORDED MATERIAL

(71) Applicant: SEIKO EPSON CORPORATION, Tokyo (JP)

(72) Inventor: Toshihiro Otake, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 23 days.

(21) Appl. No.: 14/817,531

(22) Filed: Aug. 4, 2015

(65) Prior Publication Data
US 2016/0032528 A1    Feb. 4, 2016

(30) Foreign Application Priority Data
Aug. 4, 2014    (JP) .................. 2014-158451

(51) Int. Cl.
C08F 251/02    (2006.01)
C08B 3/14    (2006.01)
D21H 11/00    (2006.01)

(52) U.S. Cl.
CPC .............. D21H 11/00 (2013.01); C08B 3/14 (2013.01); C08F 251/02 (2013.01)

(58) Field of Classification Search
CPC .......... C08F 251/02; C08B 3/14; D21H 11/00
USPC ............. 428/211.1; 536/31, 342; 526/31, 32
See application file for complete search history.

(56) References Cited

U.S. PATENT DOCUMENTS

| 5,549,861 A | 8/1996 | Huber et al. |
| 2013/0209779 A1 | 8/2013 | Iida et al. |
| 2014/0162033 A1 | 6/2014 | Giller |

FOREIGN PATENT DOCUMENTS

| GB | 2 058 803 A | * 4/1981 | ............ C08F 251/02 |
| JP | 07-268724 A | 10/1995 | |
| JP | 09-296001 A | 11/1997 | |
| JP | 2005-076026 A | 3/2005 | |
| JP | 2010-001397 A | 1/2010 | |
| JP | 2013-035251 A | 2/2013 | |
| JP | 2013-540629 A | 11/2013 | |

* cited by examiner

*Primary Examiner* — Bruce H Hess
(74) *Attorney, Agent, or Firm* — Workman Nydegger

(57) ABSTRACT

A cellulosic material contains a cellulose derivative, in which the cellulose derivative has a functional group capable of reversibly performing a redox reaction introduced thereinto. The cellulose derivative preferably has at least one of a ferrocene structure and a viologen structure as the functional group.

20 Claims, 8 Drawing Sheets

CELLULOSIC MATERIAL, CELLULOSIC MEMBER, AND RECORDED MATERIAL

CROSS-REFERENCE TO RELATED APPLICATIONS

This application claims priority to Japanese Patent Application No. 2014-158451 filed on Aug. 4, 2014. The entire disclosures of Japanese Patent Application No. 2014-158451 is hereby incorporated herein by reference.

BACKGROUND

1. Technical Field

The present invention relates to a cellulosic material, a cellulosic member, and a recorded material.

2. Related Art

Cellulose is a recyclable resource and is accumulated abundantly on earth, and also has excellent biocompatibility and degradability, and therefore is an environmentally friendly material. Accordingly, cellulose has attracted attention recently, and its effective utilization has been demanded (see, for example, JP-A-7-268724).

However, in the related art, cellulose is mainly used to produce paper products including printing paper such as plain paper, corrugated cardboard, and the like, and other than these, it is merely used to produce fibers (cellulose fibers) and the like. Therefore, there was a problem that various advantageous characteristics of cellulose are not fully utilized.

SUMMARY

An advantage of some aspects of the invention is to provide a cellulosic material capable of favorably adjusting its hydrophilicity or hydrophobicity while having the characteristics of cellulose, to provide a cellulosic member capable of favorably adjusting its hydrophilicity or hydrophobicity while having the characteristics of cellulose, and to provide a recorded material capable of favorably removing an ink component which is normally difficult to be removed after fixing.

Such an advantage is achieved by the invention described below.

An aspect of the invention is directed to a cellulosic material, which contains a cellulose derivative, and in which the cellulose derivative has a functional group capable of reversibly performing a redox reaction introduced thereinto.

According to this configuration, a cellulosic material capable of favorably adjusting its hydrophilicity or hydrophobicity while having the characteristics of cellulose can be provided.

In the aspect of the invention, it is preferred that the cellulose derivative has at least one of a ferrocene structure and a viologen structure as the functional group.

According to this configuration, a difference in the hydrophilicity (hydrophobicity) of the cellulose derivative between the oxidized state and the reduced state is increased, and therefore, the adjustment of hydrophilicity or hydrophobicity can be more favorably performed.

In the aspect of the invention, it is preferred that the cellulose derivative has the functional group introduced into a cellulose backbone structure through a double bond.

According to this configuration, the degree of freedom of the functional group is limited, and therefore, for example, undesirable deformation or the like of a cellulosic member (a cellulosic member produced using the cellulosic material) accompanying a redox reaction can be prevented, and thus, the dimensional accuracy, mechanical strength, durability, reliability, and the like of the cellulosic member can be made particularly excellent.

In the aspect of the invention, it is preferred that when the HLB value of the cellulose derivative in which the functional group is in an oxidized state is represented by X1 and the HLB value of the cellulose derivative in which the functional group is in a reduced state is represented by X2, the following relation is satisfied: $X1-X2 \geq 13$.

According to this configuration, the adjustment of hydrophilicity or hydrophobicity can be more favorably performed.

Another aspect of the invention is directed to a cellulosic member produced using the cellulosic material according to the aspect of the invention.

According to this configuration, a cellulosic member capable of favorably adjusting its hydrophilicity or hydrophobicity while having the characteristics of cellulose can be provided.

In the aspect of the invention, it is preferred that the cellulosic member is a recording medium and is capable of releasing a fixed state of an ink by performing a redox reaction of the cellulose derivative after the ink is once fixed to the recording medium.

According to this configuration, for example, even an ink component which is normally difficult to be removed after fixing can be favorably removed, and therefore, a recording medium capable of favorably performing repetitive recording can be provided. Further, with such a recording medium, after an appointed person sees recorded information or after the lapse of a certain period, the information recorded on the recording medium can be easily and reliably erased. Accordingly, the cellulosic member can be favorably used as a recording medium for recording confidential information.

Still another aspect of the invention is directed to a recorded material including the cellulosic member according to the aspect and an ink fixed to the cellulosic member.

According to this configuration, a recorded material capable of favorably removing an ink component which is normally difficult to be removed after fixing can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
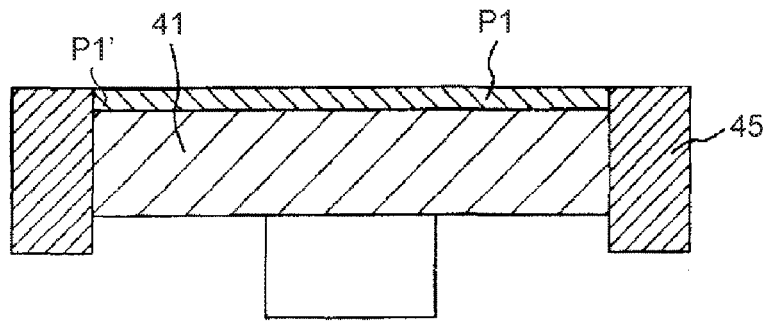
FIGS. 1A to 1H show cross-sectional views schematically illustrating respective steps according to a first embodiment of a production method for a cellulosic member.
Figure 1B:
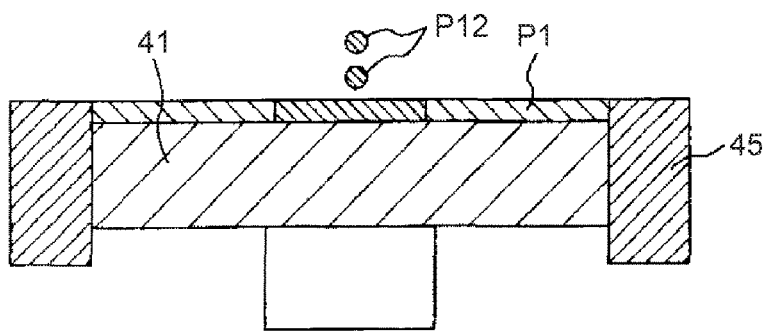
Figure 1C:
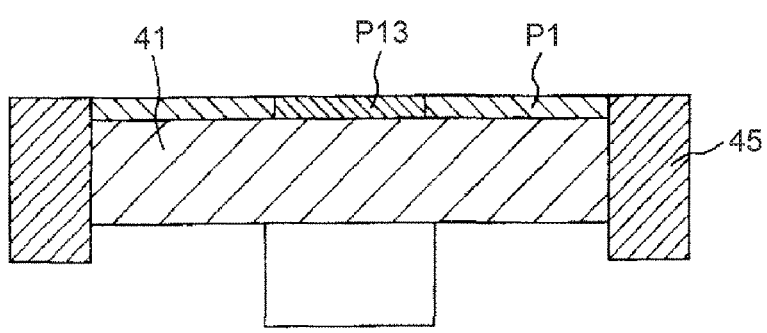
Figure 1D:
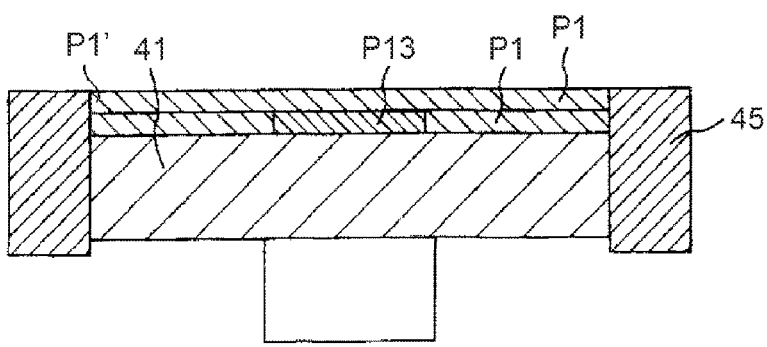
Figure 1E:
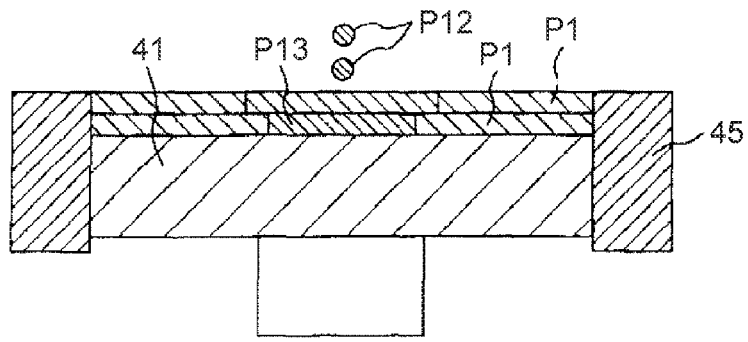
Figure 1F:
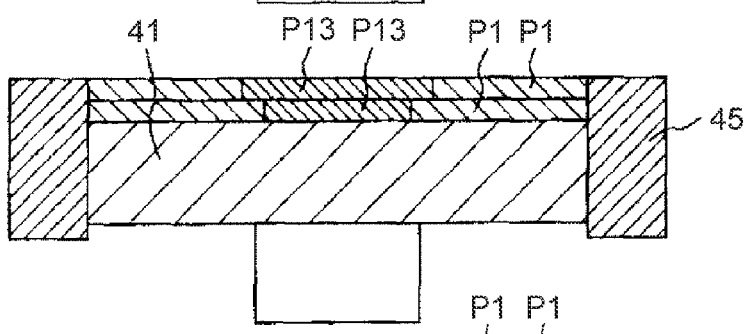
Figure 1G:
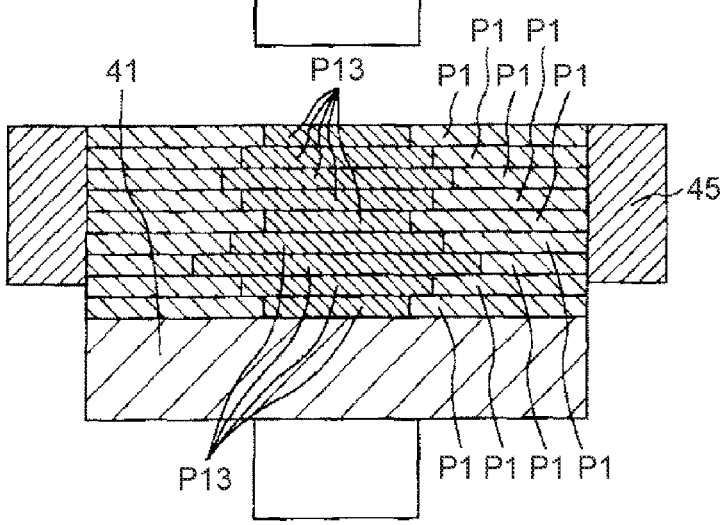
Figure 1H:
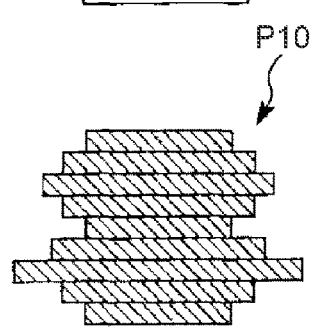
Figure 2A:
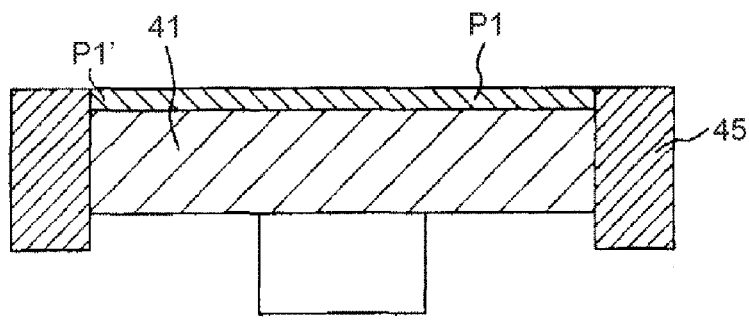
FIG. 2A to 2F show cross-sectional views schematically illustrating respective steps according to a second embodiment of a production method for a cellulosic member.
Figure 2B:
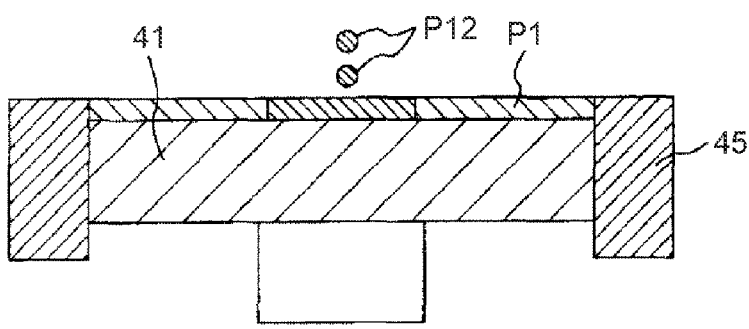
Figure 2C:
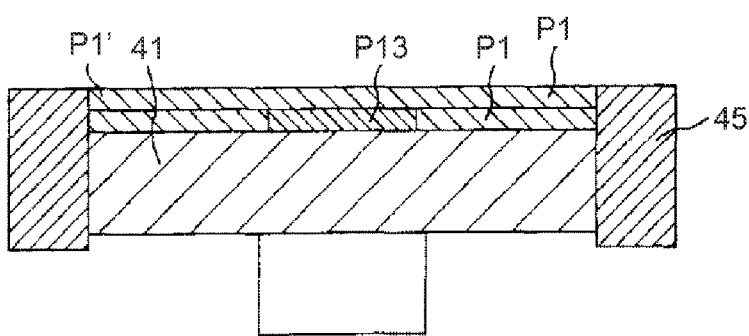
Figure 2D:
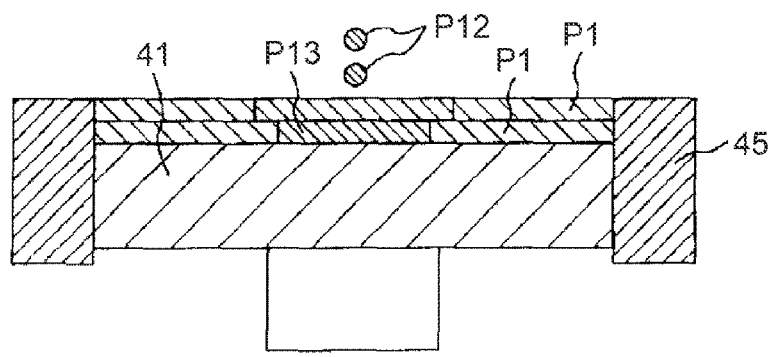
Figure 2E:
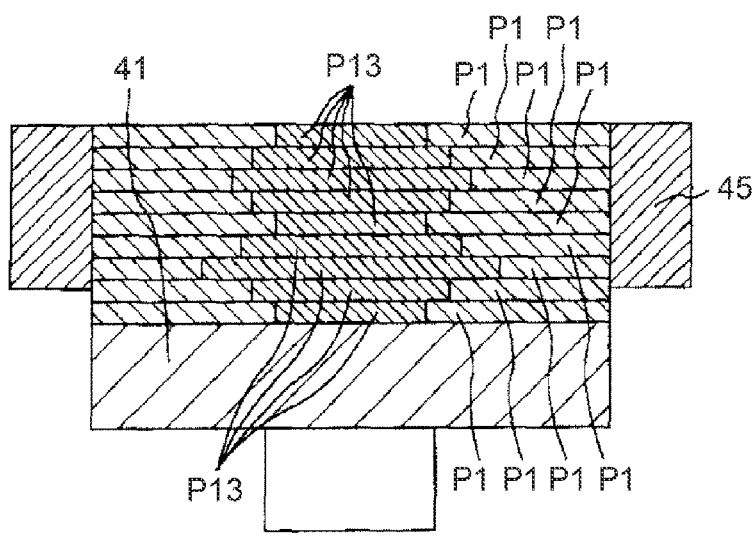
Figure 2F:
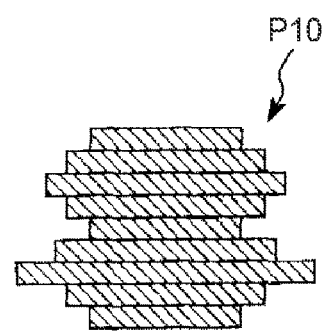
Figure 3A:
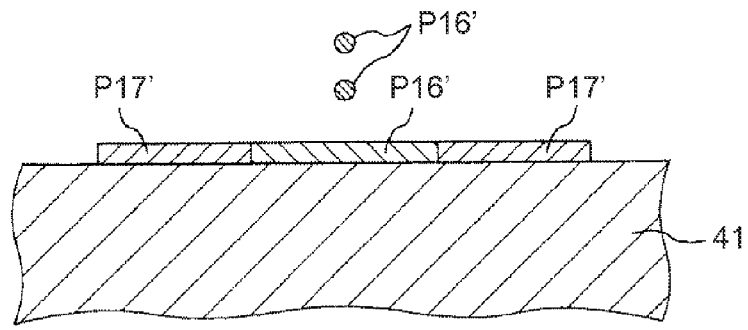
FIGS. 3A to 3F show cross-sectional views schematically illustrating respective steps according to a third embodiment of a production method for a cellulosic member.
Figure 3B:
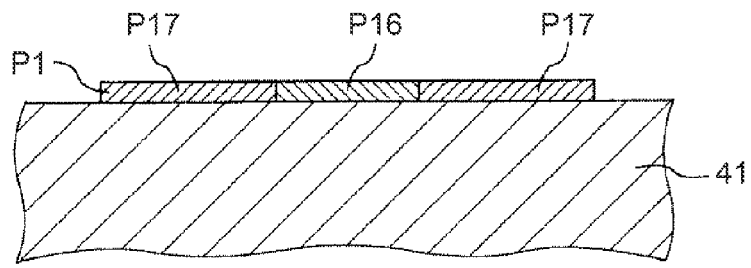
Figure 3C:
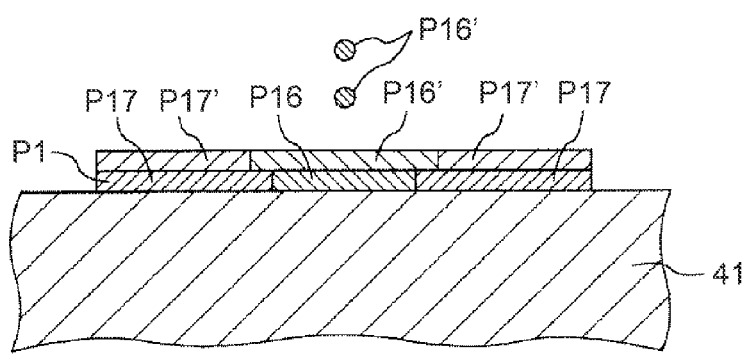
Figure 3D:
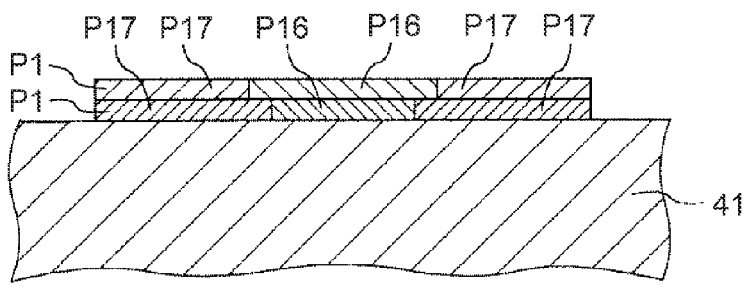
Figure 3E:
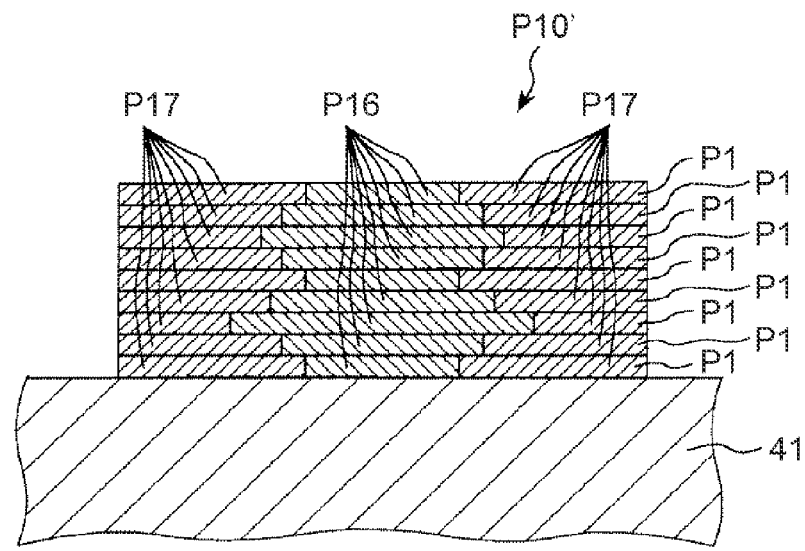
Figure 3F:
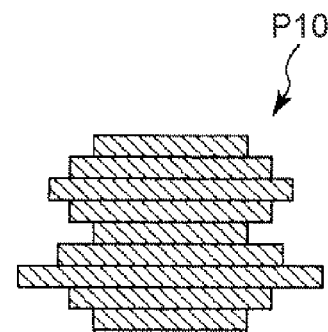

Hereinafter, preferred embodiments of the invention will be described in detail with reference to the accompanying drawings.

Cellulosic Material

First, a cellulosic material (a composition containing a cellulose derivative) according to the invention will be described in detail.

The cellulosic material (cellulosic composition) according to the invention contains a cellulose derivative.

The cellulose derivative has a functional group capable of reversibly performing a redox reaction (an oxidizable/reducible functional group) introduced thereto.

By including such a cellulose derivative, a cellulosic material and a member produced using a cellulosic material (a cellulosic member) can preferably adjust its hydrophilicity or hydrophobicity while having the characteristics of cellulose.

More specifically, the functional group capable of reversibly performing a redox reaction (an oxidizable/reducible functional group) generally has high hydrophilicity in an oxidized state and has low hydrophilicity (high hydrophobicity) in a reduced state. Due to this, the cellulose derivative having the oxidizable/reducible functional group introduced thereto has high hydrophilicity when the oxidizable/reducible functional group is in an oxidized state and has low hydrophilicity when the oxidizable/reducible functional group is in a reduced state. Therefore, by adjusting the oxidized or reduced state of the oxidizable/reducible functional group, the adjustment of the hydrophilicity or hydrophobicity of the cellulosic material and the cellulosic member can be favorably performed.

In particular, in the cellulosic material and the cellulosic member, multiple oxidizable/reducible functional groups are contained, and also a redox reaction to which the oxidizable/reducible functional group contributes quantitatively proceeds, and therefore, a state where all the oxidizable/reducible functional groups are oxidized, a state where all the oxidizable/reducible functional groups are reduced, and other than these, also an intermediate state where part of the multiple oxidizable/reducible functional groups are oxidized and the other oxidizable/reducible functional groups are reduced can be taken. Therefore, it is also possible to perform fine adjustment of hydrophilicity or hydrophobicity.

Further, the oxidizable/reducible functional group can reversibly perform a redox reaction, and therefore, a redox reaction can be performed repeatedly. Accordingly, the hydrophilicity or hydrophobicity can be adjusted multiple times, and by doing this, for example, fine adjustment of hydrophilicity or hydrophobicity can be favorably performed. Further, the cellulosic material can be favorably applied also to a recording medium for special use as described in detail later.

Further, for example, in the cellulosic material to be used in the production of the cellulosic member, the oxidizable/reducible functional group of the cellulose derivative is brought to an oxidized state, and in a production process for a cellulosic member, the oxidizable/reducible functional group of the cellulose derivative contained in the finally obtained cellulosic member is brought to a reduced state by reducing the oxidizable/reducible functional group, whereby the mechanical strength, durability, and the like of the cellulosic member can be made particularly excellent while making the productivity of the cellulosic member particularly excellent. More specifically, the hydrophilicity of the cellulose derivative is high in a state where the oxidizable/reducible functional group is oxidized, and therefore, the solubility and the like of the cellulose derivative in a material containing the cellulose derivative and water are made excellent, and the handleability (for example, the ejection stability by an inkjet method, etc.) of the material can be made excellent, and also the hydrophilicity of the cellulose derivative is decreased in a state where the oxidizable/reducible functional group is reduced, and water is excluded from the periphery of the cellulose derivative, whereby a cellulosic member, which has a low water content, and in which a rigid solidified part (a tangible part) is formed, can be obtained. Further, by using the cellulose derivative having an oxidizable/reducible functional group in an oxidized state introduced thereto, the solubility in water and the like can be made excellent, and therefore, it is not necessary to use an organic solvent for improving the solubility. Accordingly, it is not necessary to consider a load on the environment or safety for workers due to volatilization of an organic solvent in the air when producing the cellulosic member. Further, the introduction of a device for recovering an organic solvent or the like is no longer needed, and therefore, it is advantageous also from the viewpoint of the simplification of the structure of a production device for the cellulosic member and the production cost of the cellulosic member. Further, even if an organic solvent is used, the amount of use thereof can be decreased, and therefore, the same effects as mentioned above can be obtained.

The oxidation reaction and the reduction reaction of the cellulose derivative can be performed by, for example, an electrical method in which an electric charge (electron) is applied to the cellulose derivative using an electrode connected to a power source, or can also be performed by a chemical reaction using a reducing agent.

Examples of the reducing agent which can be used in the reduction reaction of the cellulose derivative include hydrazine, sodium borohydride, iron, and zinc.

Examples of an oxidizing agent which can be used in the oxidation reaction of the cellulose derivative include $NOBF_4$, a permanganate, potassium nitrate, and a chromate.

Hereinafter, components constituting the cellulosic material (cellulosic composition) according to the invention will be described.

Cellulose Derivative

Cellulose is a compound in which (β-glucose is polymerized through a glycoside bond, however, the cellulose derivative as used herein may be any as long as it is a compound capable of being derived from cellulose by a chemical reaction, and examples thereof include a cellulose derivative obtained by substituting at least part of the hydroxy groups of cellulose with another substituent (including a cellulose derivative obtained by a condensation reaction of at least part of the hydroxy groups of cellulose with another compound, etc.).

The substituent may be introduced into all the repeating units (glucose structures) in the same manner, or may be introduced into only part of the repeating units (glucose structures). Further, the substituent may be introduced into a position which is different among the repeating units (glucose structures).

The cellulose derivative to be contained in the cellulosic material according to the invention may be any as long as it is a cellulose derivative having a functional group capable of reversibly performing a redox reaction (oxidizable/reducible functional group) introduced thereto.

The oxidizable/reducible functional group is preferably ionic in an oxidized state and nonionic (neutral) in a reduced state.

According to this, a difference in the hydrophilicity (hydrophobicity) of the cellulose derivative between the oxidized state and the reduced state is particularly increased, and therefore, the effect as mentioned above is particularly remarkably exhibited.

When the HLB value of the cellulose derivative in which the oxidizable/reducible functional group is in an oxidized state is represented by X1 and the HLB value of the cellulose derivative in which the oxidizable/reducible functional group is in a reduced state is represented by X2, it is preferred to satisfy the following relation: X1−X2≥13, it is more preferred to satisfy the following relation: X1−X2≥18.

According to this, the effect of the invention as mentioned above is particularly remarkably exhibited.

Further, the HLB value of the cellulose derivative in which the oxidizable/reducible functional group is in an oxidized state (X1) is preferably 16 or more, more preferably 19 or more.

According to this, the effect of the invention as mentioned above is more remarkably exhibited.

Further, the HLB value of the cellulose derivative in which the oxidizable/reducible functional group is in a reduced state (X2) is preferably 3 or less, more preferably 1 or less.

According to this, the effect of the invention as mentioned above is more remarkably exhibited.

The functional group capable of reversibly performing a redox reaction (oxidizable/reducible functional group) is preferably at least one of a ferrocene structure and a viologen structure.

By having such a functional group, a difference in the hydrophilicity (hydrophobicity) of the cellulose derivative between the oxidized state and the reduced state is particularly increased, and therefore, the effect as mentioned above is particularly remarkably exhibited. Further, the control of the degree of oxidation or reduction of the cellulose derivative can be facilitated, and thus, the adjustment of the hydrophilicity (hydrophobicity) of the cellulosic material and the cellulosic member can be favorably performed.

The oxidizable/reducible functional group may be introduced into any position of the cellulose derivative, but is preferably introduced into a hydroxy group bonded to the carbon atom at position 6 of β-glucose constituting cellulose by a chemical reaction. That is, it is preferred that the oxidizable/reducible functional group is introduced into $R^3$ in the following formula (2).

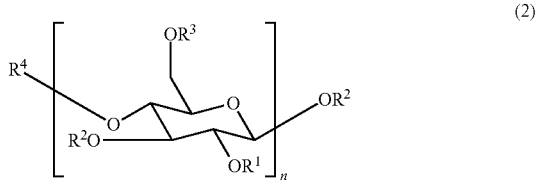

(2)

In the formula (2), $R^1$, $R^2$, $R^3$, $R^4$, and $R^5$ each independently represent a hydrogen atom or a substituent, provided that at least one substituent is introduced into the molecule.

According to this, the hydrophilicity (hydrophobicity) of the cellulose derivative depending on the state (difference between the oxidized state and the reduced state) of the oxidizable/reducible functional group of the cellulose derivative can be made to differ to a large extent, and thus, the effect as mentioned above can be more remarkably exhibited. Further, the redox reaction can be made to more favorably proceed when needed. Further, the cellulose derivative having the oxidizable/reducible functional group can be easily and efficiently synthesized, and therefore, it is advantageous also from the viewpoint of reduction in the production cost of the cellulosic material and the cellulosic member.

At least one oxidizable/reducible functional group may be introduced into the molecule of the cellulose derivative, however, it is preferred that multiple oxidizable/reducible functional groups are introduced into the molecule of the cellulose derivative.

According to this, the hydrophilicity (hydrophobicity) of the cellulose derivative depending on the state (difference between the oxidized state and the reduced state) of the oxidizable/reducible functional group of the cellulose derivative can be made to differ to a large extent, and thus, the effect as mentioned above can be more remarkably exhibited.

The cellulose derivative is preferably a cellulose derivative having the oxidizable/reducible functional group introduced into a cellulose backbone structure through a double bond.

According to this, the degree of freedom of the oxidizable/reducible functional group is limited, and therefore, for example, undesirable deformation or the like of the cellulosic member accompanying a redox reaction can be prevented, and thus, the dimensional accuracy, mechanical strength, durability, reliability, and the like of the cellulosic member can be made particularly excellent.

Specific examples of a preferred cellulose derivative satisfying such conditions include cellulose derivatives represented by the following formulae (3) and (4).

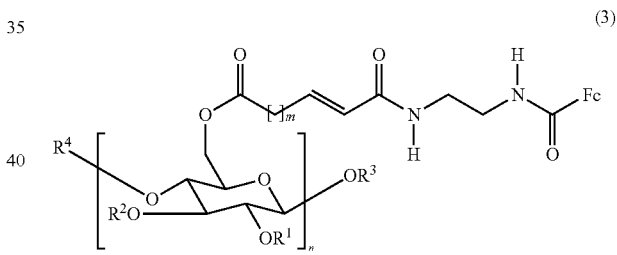

(3)

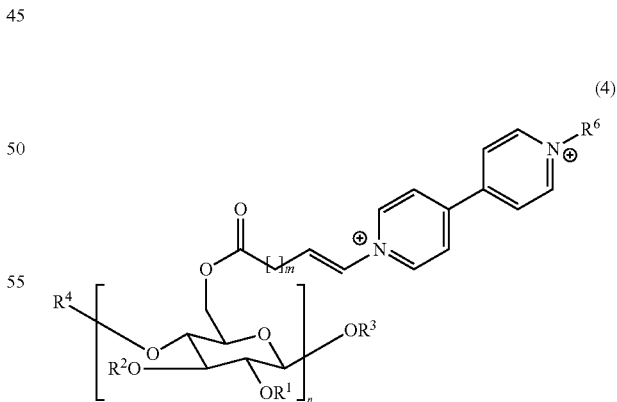

(4)

In the formulae (3) and (4), n is an integer of 2 or more, m is an integer of 1 or more, and $R^1$, $R^2$, $R^3$, $R^4$, and $R^5$ are each independently a hydrogen atom (H) or an acetyl group ($CH_3CO$), and $R^6$ is a hydrocarbon group having 1 or more and 6 or less carbon atoms. Further, in the formula (3), Fc is a structure represented by the following formula (5).

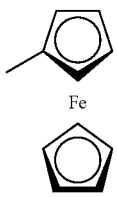

(5)

The weight average molecular weight of the cellulose derivative is not particularly limited, but is preferably 5,000 or more and 10,000,000 or less, more preferably 10,000 or more and 7,000,000 or less.

According to this, the durability, strength, and reliability of the cellulosic member to be produced can be made particularly excellent. Further, in the case where the cellulosic material (cellulosic composition) contains a solvent, the storage stability, handleability (for example, the ejection stability by an inkjet method), and the like of the cellulosic material (cellulosic composition) can be made excellent.

The content of the cellulose derivative in the cellulosic material (cellulosic composition) is not particularly limited, but is preferably 30% by mass or more, more preferably 40% by mass or more and 90% by mass or less, further more preferably 45% by mass or more and 85% by mass or less with respect to the total content of solid components contained in the cellulosic material (cellulosic composition) (all the components to be contained in the cellulosic member).

According to this, the effect of including the cellulose derivative as mentioned above can be more remarkably exhibited while making the storage stability, handleability (for example, the ejection stability by an inkjet method), and the like of the cellulosic material (cellulosic composition) excellent.

The form of the cellulose derivative in the cellulosic material (cellulosic composition) is not particularly limited, however, for example, in the case where the cellulosic material (cellulosic composition) contains a solvent as described below, the cellulose derivative may be in a dissolved state or in a dispersed state or in a mixed state of these states.

In the case where the cellulose derivative is dispersed in the cellulosic material (cellulosic composition), the average particle diameter of the cellulose derivative in the cellulosic material (cellulosic composition) is not particularly limited, but is preferably 5.0 μm or less, more preferably 1.0 μm or less.

According to this, while making the storage stability, handleability (for example, the ejection stability by an inkjet method), and the like of the cellulosic material (cellulosic composition) excellent, the durability, strength, and reliability of the cellulosic member to be produced can be made particularly excellent.

The "average particle diameter" as used herein refers to an average particle diameter on a volume basis and can be determined by, for example, adding a sample to methanol, followed by dispersion for 3 minutes using an ultrasonic disperser, and then, measuring the resulting dispersion liquid using a particle size distribution analyzer employing a Coulter counter method (for example, TA-II, manufactured by Coulter Electronics, Inc.) with an aperture of 50 μm.

Solvent

The cellulosic material (cellulosic composition) may contain a solvent in addition to the cellulose derivative as mentioned above.

According to this, the fluidity of the cellulosic material (cellulosic composition) can be made excellent, and thus, the handleability (for example, the ejection stability by an inkjet method) of the cellulosic material (cellulosic composition) can be made particularly excellent.

In particular, the cellulosic material (cellulosic composition) preferably contains a solvent which dissolves the cellulose derivative as the solvent.

According to this, an undesirable variation in composition in the cellulosic material (cellulosic composition) can be effectively prevented. Further, for example, the ejection stability and the like of cellulosic material (cellulosic composition) by an inkjet method can be made particularly excellent. As a result, the cellulosic member can be stably produced over a long period of time.

As the solvent constituting the cellulosic material (cellulosic composition), for example, various organic solvents and various inorganic solvents can be used.

In particular, in the case where the cellulose derivative in which the oxidizable/reducible functional group is in an oxidized state is contained, generally, the affinity for water (hydrophilicity) is high, and therefore, a solvent containing water is preferred as the solvent.

In the case where the cellulose derivative in which the oxidizable/reducible functional group is in a reduced state is contained, generally, the affinity for an organic solvent (hydrophobicity) is high, and therefore, a solvent containing an organic solvent is preferred as the solvent.

Examples of the organic solvent constituting the cellulosic material (cellulosic composition) include ethers such as tetrahydrofuran; halides such as chloroform and dichloromethane; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetyl acetone; and alcohols such as ethanol, propanol, and butanol.

The content of the solvent in the cellulosic material (cellulosic composition) is not particularly limited, but is preferably 10% by mass or more and 70% by mass or less, more preferably 20% by mass or more and 50% by mass or less.

According to this, for example, while making the ejection stability and the like of the cellulosic material (cellulosic composition) more excellent, the solvent can be removed more rapidly after the cellulosic material (cellulosic composition) is applied, and therefore, the productivity of the cellulosic member can be made particularly excellent.

Another Component

The cellulosic material (cellulosic composition) may contain a component (another component) other than the above-mentioned components. Examples of such a component include various coloring agents such as a pigment and a dye, various fluorescent materials, various light storage materials, various phosphorescent materials, an infrared absorbing material, a dispersant, an oxidizing agent, a reducing agent, a surfactant, a polymerizable compound (a polymerizable resin), a polymerization initiator, a polymerization accelerator, a crosslinking agent, a siloxane compound, a permeation accelerator, a wetting agent (a humectant), a fixing agent, an antifungal agent, a preservative, an antioxidant, a UV absorbing agent, a chelating agent, a pH adjusting agent, a thickening agent, a filler, an anti-aggregation agent, and a defoaming agent.

The cellulosic material (cellulosic composition) may contain, as another component, a cellulose derivative having no oxidizable/reducible functional group as mentioned above introduced thereinto (another cellulose derivative) or cellulose which is not chemically modified. In such a case, for example, the cellulose derivative having the oxidizable/reducible functional group as mentioned above introduced thereinto may be provided in the vicinity of the surface of the another cellulose derivative in the form of a solid or cellulose which is not chemically modified in the cellulosic material.

In particular, by including a coloring agent in the cellulosic material (cellulosic composition), the cellulosic member colored in a color corresponding to the color of the coloring agent can be obtained.

In particular, by including a pigment as the coloring agent, the light resistance of the cellulosic material (cellulosic composition) and the cellulosic member can be made favorable. As the pigment, either of an inorganic pigment and an organic pigment can be used.

Examples of the inorganic pigment include carbon blacks (C.I. Pigment Black 7) such as Furnace Black, Lamp Black, Acetylene Black, and Channel Black, iron oxide, and titanium oxide, and one pigment or a combination of two or more pigments selected from these can be used.

Among the inorganic pigments mentioned above, in order to take on a preferred white color, titanium oxide is preferred.

Examples of the organic pigment include azo pigments such as insoluble azo pigments, condensed azo pigments, azo lakes, and chelate azo pigments, polycyclic pigments such as phthalocyanine pigments, perylene and perinone pigments, anthraquinone pigments, quinacridone pigments, dioxane pigments, thioindigo pigments, isoindolinone pigments, and quinophthalone pigments, dye chelates (for example, basic dye type chelates, acidic dye type chelates, etc.), dye lakes (basic dye type lakes and acidic dye type lakes), nitro pigments, nitroso pigments, and aniline black, and one pigment or a combination of two or more pigments selected from these can be used.

More specifically, examples of the carbon black to be used as a black pigment include No. 2300, No. 900, MCF88, No. 33, No. 40, No. 45, No. 52, MA7, MA8, MA100, No. 2200B, etc. (all are manufactured by Mitsubishi Chemical Corporation), Raven 5750, Raven 5250, Raven 5000, Raven 3500, Raven 1255, Raven 700, etc. (all are manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, etc. (all are manufactured by CABOT JAPAN K.K.), and Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, Special Black 4, etc. (all are manufactured by Degussa GmbH).

Examples of a white pigment include C.I. Pigment White 6, 18, and 21.

Examples of a yellow pigment include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of a magenta pigment include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violet 19, 23, 32, 33, 36, 38, 43, and 50.

Examples of a cyan pigment include C.I. Pigment Blue 1, 2, 3, 15, 15:1, 15:2, 15:3, 15:34, 15:4, 16, 18, 22, 25, 60, 65, and 66 and C.I. Vat Blue 4 and 60.

Examples of a pigment other than the above-mentioned pigments include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

In the case where the cellulosic material (cellulosic composition) contains a pigment, the average particle diameter of the pigment is preferably 300 nm or less, more preferably 50 nm or more and 250 nm or less. According to this, for example, in the case where the cellulosic material (cellulosic composition) contains a solvent (a dispersion medium for dispersing the pigment), the dispersion stability of the pigment in the cellulosic material (cellulosic composition) and the ejection stability of the cellulosic material (cellulosic composition) can be made particularly excellent, and also an image with a higher image quality can be formed.

Examples of the dye include acidic dyes, direct dyes, reactive dyes, and basic dyes, and one dye or a combination of two or more dyes selected from these can be used.

Specific examples of the dye include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79 and 249, and C.I. Reactive Black 3, 4, and 35.

In the case where the cellulosic material (cellulosic composition) contains the coloring agent, the content of the coloring agent in the cellulosic material (cellulosic composition) is preferably 1% by mass or more and 20% by mass or less. According to this, particularly excellent concealing property and color reproducibility are obtained.

In particular, in the case where the cellulosic material (cellulosic composition) contains titanium oxide as the coloring agent, the content of titanium oxide in the cellulosic material (cellulosic composition) is preferably 1% by mass or more and 18% by mass or less, more preferably 2% by mass or more and 16% by mass or less with respect to the total content of solid components contained in the cellulosic material (cellulosic composition) (all the components to be contained in the cellulosic member). According to this, a particularly excellent concealing property is obtained.

Examples of the fluorescent material constituting the cellulosic material (cellulosic composition) include C.I. Direct Yellow 87, C.I. Acid Red 52, C.I. Acid Red 92, Brilliant Sulfo Flavin, Eosin, Basic Flavin, Acridine Orange, Rhodamine 6G, and Rhodamine B.

Examples of the light storage material constituting the cellulosic material (cellulosic composition) include sulfides of alkaline earth metals such as zinc, calcium, strontium, and barium, and light storage materials such as strontium aluminate, or inorganic fluorescent materials such as various sulfides and oxides exemplified as zinc sulfide.

Examples of the phosphorescent material constituting the cellulosic material (cellulosic composition) include an iridium complex and a cyclometallated complex.

Examples of the infrared absorbing material constituting the cellulosic material (cellulosic composition) include ITO and ATO fine particles.

In the case where the cellulosic material (cellulosic composition) contains a dispersoid such as a pigment, if the cellulosic material (cellulosic composition) further contains a dispersant, the dispersibility of the dispersoid can be made more favorable.

The dispersant is not particularly limited, but examples thereof include dispersants which are commonly used for preparing a pigment dispersion liquid such as a polymeric dispersant.

Specific examples of the polymeric dispersant include dispersants containing, as a main component, at least one of polyoxyalkylene polyalkylene polyamine, a vinyl-based polymer or copolymer, an acrylic polymer or copolymer, polyester, polyamide, polyimide, polyurethane, an amino-based polymer, a silicon-containing polymer, a sulfur-containing polymer, a fluorine-containing polymer, and an epoxy resin.

Examples of a commercially available product of the polymeric dispersant include AJISPER series manufactured by Ajinomoto Fine-Techno Co., Inc., Solsperse series (Solsperse 36000, etc.) available from Noveon, Inc., DISPER-BYK series manufactured by BYK, Inc., and DISPARLON series manufactured by Kusumoto Chemicals, Ltd.

When the cellulosic material (cellulosic composition) contains a surfactant, the abrasion resistance of the cellulosic member can be made more favorable.

The surfactant is not particularly limited, however, for example, a polyester-modified silicone, a polyether-modified silicone, or the like as a silicone-based surfactant can be used, and in particular, it is preferred to use polyether-modified polydimethylsiloxane or polyester-modified polydimethylsiloxane.

Specific examples of the surfactant include BYK-347, BYK-348, BYK-UV 3500, BYK-UV 3510, BYK-UV 3530, and BYK-UV 3570 (all are trade names of products manufactured by BYK, Inc.).

The viscosity of the cellulosic material (cellulosic composition) is preferably 10 mPa·s or more and 30 mPa·s or less, more preferably 15 mPa·s or more and 25 mPa·s or less.

According to this, for example, the ejection stability of the cellulosic material (cellulosic composition) by an inkjet method can be made particularly excellent.

The "viscosity" as used herein refers to a value obtained by measurement at 25° C. using an E-type viscometer (for example, VISCONIC ELD, manufactured by Tokyo Keiki, Inc.).

Cellulosic Member

Next, the cellulosic member according to the invention will be described.

The cellulosic member according to the invention is characterized by being produced using the cellulosic material (cellulosic composition) according to the invention as mentioned above.

According to this, a cellulosic member capable of favorably adjusting its hydrophilicity or hydrophobicity while having the characteristics of cellulose can be provided.

The cellulosic member according to the invention has such excellent characteristics, and therefore can be applied to various uses.

For example, the cellulosic member can be favorably applied to a recording medium whose hydrophilicity (hydrophobicity) can be changed depending on the type of an ink (recording ink) such as a water-based ink or an oil-based ink.

According to this, a recording medium capable of favorably performing recording with a wide variety of inks (recording inks) can be provided. Further, a recording medium having high selectivity capable of favorably performing recording with an ink only in the case of using a specific ink can be provided.

Further, by adjusting the ratio of the oxidizable/reducible functional group present in the cellulose derivative, the HLB value of the cellulose derivative when the oxidizable/reducible functional group is in an oxidized state, or the like, the cellulosic member can also be applied to a recording medium which has high durability to water or the like in a reduced state, but has a water solubility which is increased by conversion to an oxidized state.

According to this, the efficiency of reuse (recycling) of a cellulose resource can be made particularly excellent. Further, from the viewpoint of protection of information, labor of shredding using a shredder when a recording medium having information recorded thereon (a recorded material) is discarded or the like can be omitted.

Further, for example, the cellulosic member according to the invention can be favorably applied to a recording medium capable of releasing a fixed state of an ink (recording ink) by performing a redox reaction of the cellulose derivative after the ink is once fixed to the recording medium.

According to this, for example, an ink component (coloring agent) which is normally difficult to be removed after fixing can be favorably removed, and therefore, a recording medium capable of favorably performing repetitive recording can be provided.

Further, with such a recording medium, after an appointed person sees recorded information or after the lapse of a certain period, the information recorded on the recording medium can be easily and reliably erased. Accordingly, the cellulosic member can be favorably used as a recording medium for recording confidential information.

Further, in the invention, the control of the hydrophilicity can be favorably performed, and therefore, for example, even in the case of using water in a production step of the cellulosic member, the water content in the cellulosic member to be obtained can be decreased, or the moisture absorbability or water absorbability of the cellulosic member can be decreased. As a result, in the cellulosic member, a bond of the cellulose derivative can be made rigid, and thus, the mechanical strength, durability, reliability, and the like of the cellulosic member can be made excellent.

Accordingly, the cellulosic member can be favorably applied to the use requiring mechanical strength, durability, and the like.

The cellulosic member according to the invention can be applied to, for example, ornaments and exhibits such as dolls and figures; medical devices such as artificial dialyzers and implants; optical members such as lenses (including variable focus lenses), phase difference films, and polarizing plates; gel materials such as culture scaffold materials to be used for cultivation of various cells, various bacteria, etc.; vehicles such as bicycles; nursing care goods such as wheelchairs, and the like, and constituent components thereof, and the like. Further, according to the invention, a cellulosic member having a light weight and a high strength can be formed, and therefore, the cellulosic member can be favorably applied also to various housings.

Further, the cellulosic member according to the invention may be applied to any of prototypes, mass-produced products, and custom-made products.

Recorded Material

Next, the recorded material according to the invention will be described.

The recorded material according to the invention is characterized in that an ink is fixed to the cellulosic member as mentioned above.

According to this, for example, an ink component (coloring agent) which is normally difficult to be removed after fixing can be favorably removed from the recorded material.

Such a recorded material is capable of easily and reliably erasing recorded information after an appointed person sees recorded information or after the lapse of a certain period, and therefore is suitable for recording confidential information.

Production Method for Cellulosic Member

Next, a production method for the cellulosic member according to the invention as mentioned above will be described.

The cellulosic member according to the invention may be any as long as it is produced using the cellulosic material (cellulosic composition) according to the invention as mentioned above, and the production method for the cellulosic member is not particularly limited.

Examples of the production method for the cellulosic member according to the invention include various molding methods such as compression molding, extrusion molding, and injection molding, and methods for subjecting a bulk material to a machining process such as cutting, grinding, or polishing.

Further, as the production method for the cellulosic member according to the invention, a three-dimensional shaping method (a method for producing a three-dimensionally shaped article by repeating a step of forming a pattern in the form of a layer having a given shape and superimposing the patterns on one another) as described below can be used.

According to this, the production method can be favorably applied to the production of a cellulosic member having a complicated shape, and also to the production of multiple types of cellulosic members having different shapes and sizes.

Hereinafter, an example to which a three-dimensional shaping method is applied will be described as a specific example of the production method for the cellulosic member.

In the following description, a case where in the production of the cellulosic member, a material containing a cellulose derivative having an oxidizable/reducible functional group in an oxidized state is used, and when the cellulosic member is produced, the oxidizable/reducible functional group is reduced will be representatively described.

First Embodiment

FIGS. 1A to 1H are cross-sectional views schematically showing respective steps according to a first embodiment of the production method for a cellulosic member.

As shown in FIGS. 1A to 1H, the production method of this embodiment is configured as follows. The method includes a layer forming step (1*a* and 1*d*) in which a layer P1 having a given thickness is formed in a region surrounded by a side surface support section (a frame body) 45 using a particle body-containing composition P1', an ink application step (a pattern forming step) (1*b* and 1*e*) in which an ink P12 containing water and a cellulose derivative having an oxidizable/reducible functional group introduced thereinto is applied to the layer P1 by an inkjet method, and a reduction step (1*c* and 1*f*) in which the oxidizable/reducible functional group of the cellulose derivative is reduced. After these steps are sequentially and repeatedly performed (1*g*), the method further includes an unbonded particle removal step (1*h*) in which among the particle bodies constituting the respective layers P1, particle bodies which are not bonded to one another by the cellulose derivative (bonding agent) are removed.

Hereinafter, the respective steps will be described.

Layer Forming Step

In the layer forming step, a layer P1 having a given thickness is formed using a particle body-containing composition (a three-dimensional shaping composition) P1' (*a* and 1*d*).

In this manner, by using the particle body-containing composition P1', the dimensional accuracy of a cellulosic member (three-dimensionally shaped article) P10 to be obtained finally can be made excellent. Further, the heat resistance, mechanical strength, and the like of the cellulosic member P10 can be made particularly excellent.

The composition P1' will be described in detail later.

In this step, by using a flattening unit, the layer P1 is formed such that the surface is flattened. In the first layer forming step, the layer P1 is formed to a given thickness on the surface of a stage 41 (1*a*). At this time, the side surface of the stage 41 and the side surface support section 45 are in a close contact (abutment) state, so that the composition P1' is prevented from falling between the stage 41 and the side surface support section 45.

In each layer forming step after the first layer forming step, a new layer P1 (for example, the second layer) is formed on the surface of the layer P1 (for example, the first layer) formed in the previous step (1*d*). At this time, the side surface of the layer P1 on the stage 41 (in the case where multiple layers P1 are provided on the stage 41, at least the layer P1 provided on the uppermost side) and the side surface support section 45 are in a close contact (abutment) state, so that the composition P1' is prevented from falling between the stage 41 and the layer P1 on the stage 41.

In this step, the composition P1' may be heated. By doing this, for example, in the case where the composition P1' contains a molten component, the composition P1' can be more favorably formed into a paste.

The viscosity of the composition P1' in this step is preferably 7,000 mPa·s or more and 60,000 mPa·s or less, more preferably 10,000 mPa·s or more and 50,000 mPa·s or less. According to this, the occurrence of an undesirable variation in the film thickness of the layer P1 to be formed can be more effectively prevented.

The thickness of the layer P1 to be formed in this step is not particularly limited, but is, for example, preferably 30 μm or more and 500 μm or less, more preferably 70 μm or more and 150 μm or less. According to this, while making the productivity of the cellulosic member P10 sufficiently high, the occurrence of undesirable irregularities or the like in the cellulosic member P10 to be produced is more effectively prevented, and the dimensional accuracy of the cellulosic member P10 can be made particularly excellent.

Ink Application Step (Pattern Forming Step)

After the layer P1 is formed in the layer forming step, an ink P12 containing water and a cellulose derivative having an oxidizable/reducible functional group in an oxidized state introduced thereinto is applied to the layer P1 by an inkjet method (1*b* and 1*e*).

The ink P12 will be described in detail later. However, the ink P12 generally contains water and a cellulose derivative having an oxidizable/reducible functional group in an oxidized state with high hydrophilicity, and has sufficient fluidity in this step. According to this, the ink P12 has excellent handleability (ease of handling) and ejection stability, and therefore, the cellulosic member P10 having a desired shape can be stably produced.

In this step, the ink P12 (the ink P12 containing the cellulose derivative and water) is selectively applied only to a region corresponding to a tangible part (a region where a tangible body is present) of the cellulosic member P10 in the layer P1, whereby a pattern having a desired shape is formed.

By doing this, the particle bodies constituting the layer P1 are firmly bonded to one another, whereby a bonded part (a tangible part) P13 having a desired shape can be formed in the end. Further, since the ink P12 containing the cellulose derivative is applied only to a region where the tangible part P13 is to be formed, the material (particularly, the cellulose derivative) can be prevented from wasting.

In particular, in this embodiment, the pattern is formed by applying the ink (a binding liquid) P12 containing the cellulose derivative and water to the layer P1 constituted by the material containing particle bodies in a given shape.

According to this, in the production process for the cellulosic member P10 as described in detail later, the effect of the reduction of the oxidizable/reducible functional group (excellent mechanical strength, etc.) and the filler effect of the firm bonding of the particle bodies and the cellulose derivative synergistically act on each other, and thus, the properties such as mechanical strength of the finally obtained cellulosic member P10 can be made particularly excellent.

In this step, the ink P12 is applied by an inkjet method, and therefore, even if the pattern in which the ink P12 is applied has a fine shape, the ink P12 can be applied with high reproducibility. As a result, the dimensional accuracy of the finally obtained cellulosic member P10 can be made particularly high.

The ink P12 will be described in detail later.

Reduction Step

After the ink P12 is applied to the layer P1 in the ink application step, the cellulose derivative constituting the ink P12 is reduced. That is, the oxidizable/reducible functional group of the cellulose derivative is changed from an oxidized state to a reduced state.

According to this, the cellulose derivative changes from a high hydrophilic state to a low hydrophilic state (a high hydrophobic state). As a result, water contained in the ink P12 easily moves to the outside of the pattern. As a result, water is removed from the pattern in which the ink P12 is applied, and thus, the bonded part (tangible part) P13 in a solidified state is formed (1c and 1f).

In this manner, by removing water from the bonded part (tangible part) P13 formed using the ink P12 by utilizing a reduction reaction, the bonded part (tangible part) P13 is less likely to be adversely affected by the existence of water. Further, since the oxidizable/reducible functional group of the cellulose derivative is in a reduced state, the ex-post absorption of water in the bonded part (tangible part) P13 can be effectively prevented and suppressed. As a result, the advantageous characteristics intrinsically possessed by cellulose are easily exhibited, and thus, the bonded part (tangible part) P13 has excellent mechanical strength, durability, and the like.

This step (reduction step) may be performed by an electrical method in which an electric charge (electron) is applied to the cellulose derivative using an electrode connected to a power source, but is preferably performed by a chemical reaction using a reducing agent.

By doing this, the productivity of the cellulosic member P10 can be made particularly excellent. Further, even if the shape of the pattern constituted by the material containing the cellulose derivative is complicated, the reduction reaction can be made to easily and reliably proceed in the reduction step, which will be described in detail later.

Examples of the reducing agent include hydrazine, sodium borohydride, iron, and zinc. Among these, hydrazine and sodium borohydride are preferred.

The reaction conditions in this step vary depending on the type of the cellulose derivative, the type of the reducing agent, and the like, however, for example, this step can be more favorably performed by heating.

By doing this, the reduction reaction can be made to easily and efficiently proceed. Further, by performing the reduction reaction by heating, the cellulose derivative becomes hydrophobic, and therefore, water coming to (separated from) the surface of the layer P1 can be efficiently evaporated. As a result, the productivity of the cellulosic member P10 can be made particularly excellent.

In the case where this step is performed by heating, the heating temperature is preferably 50° C. or higher and 180° C. or lower, more preferably 60° C. or higher and 150° C. or lower.

According to this, while effectively preventing undesirable denaturation, deterioration, or the like of the material, the effect as mentioned above can be more remarkably exhibited.

The reducing agent may be, for example, contained in the ink P12 in advance, or may be contained in the composition (three-dimensional shaping composition) P1' in advance, or may be applied to a region to which the ink P12 is applied after the ink P12 is applied to the layer P1.

In the case where the reducing agent is contained in the ink P12 in advance, the occurrence of an undesirable variation in the existing amount of the reducing agent in each region to which the ink P12 is applied is effectively prevented, and therefore, the reduction reaction can be made to more equally proceed in each region. Further, the amount of the reducing agent to be consumed in other than the objective reduction reaction can be reduced, and therefore, this configuration is preferred also from the viewpoint of resource saving and reduction in the production cost.

In the case where the reducing agent is contained in the composition (three-dimensional shaping composition) P1' in advance, the ink P12 can be made not to contain the reducing agent, and therefore, the storage stability of the ink P12 can be made particularly excellent. Further, when the ink P12 is applied to the layer P1, the cellulose derivative and the reducing agent rapidly come in contact with each other, and therefore, the reduction reaction can be made to more rapidly proceed. More specifically, by heating the layer P1 in advance when the ink P12 is applied thereto, the reduction reaction can be started immediately after the ink P12 comes in contact with the layer P1. As a result, the productivity of the cellulosic member P10 can be made particularly excellent.

In the case where the reducing agent is applied to a region to which the ink P12 is applied after the ink P12 is applied to the layer P1, the reducing agent having a low inactivation rate can be efficiently brought into contact with the cellulose derivative, and therefore, the reduction reaction can be made to efficiently proceed, and also the control of the time required for the reduction step and the like can be easily performed.

In the case where the reducing agent is applied to a region to which the ink P12 is applied after the ink P12 is applied to the layer P1, for example, a method in which a liquid containing the reducing agent is applied to the layer P1 by a spraying method, an inkjet method, or the like, a method in which the layer P1 is soaked in a liquid containing the reducing agent, a method in which the layer P1 is exposed in an atmosphere containing the reducing agent, or the like can be used.

Further, in this embodiment, a series of steps including the pattern forming step (ink application step) and the reduction step are performed repeatedly.

By doing this, the amount of water remaining in the finally obtained cellulosic member P10 can be particularly reduced, and thus, the mechanical strength, durability, reliability, and the like of the cellulosic member P10 can be made particularly excellent.

It is preferred to perform this step (reduction step) while performing a treatment of removing water (a drying treatment).

By doing this, the content of water in the finally obtained cellulosic member P10 can be particularly reduced.

Such a drying treatment can be performed by, for example, a heating treatment or a decompression treatment.

Incidentally, prior to the reduction step, a treatment of partially removing water contained in the ink P12 (a pre-drying treatment) may be performed.

By doing this, excessive water can be effectively prevented from rapidly coming to the surface of the layer P1 or the like after the reduction step, and thus, the productivity of the cellulosic member P10 can be made particularly excellent.

Further, after the reduction treatment, a treatment of removing water coming to the surface of the layer P1 (a post-drying treatment) may be performed.

Unbonded Particle Removal Step

After the steps as mentioned above are performed repeatedly, as a post-treatment step, an unbonded particle removal step (1h) in which among the particle bodies constituting the respective layers P1, particle bodies which are not bonded to one another by the ink P12 (unbonded particles) are removed is performed. By doing this, the cellulosic member P10 is taken out.

Examples of a specific method of this step include a method in which the unbonded particles are removed by brushing with a brush or the like, a method in which the unbonded particles are removed by suction, a method in which a gas such as air is blown, a method in which a liquid such as water is applied (for example, a method in which a stacked body obtained as mentioned above is soaked in a liquid, a method in which a liquid is blown, etc.), and a method in which vibration such as ultrasonic vibration is applied. Further, two or more methods selected from these methods can be performed in combination. More specifically, a method in which a gas such as air is blown to the stacked body, and thereafter, the stacked body is soaked in a liquid such as water, a method in which ultrasonic vibration is applied to the stacked body while soaking the stacked body in a liquid such as water, or the like can be exemplified. Above all, it is preferred to adopt a method in which a liquid containing water is applied to the stacked body obtained as mentioned above (particularly, a method in which the stacked body is soaked in a liquid containing water).

By doing this, the unbonded particles can be efficiently removed by a simple method. Incidentally, cellulose is a material having high water absorbability and high moisture absorbability, and therefore, in the case where cellulose is used in place of the cellulose derivative to be used in the invention, when the unbonded particles are removed by the method as mentioned above, a problem arises that the shaped article absorbs water used for removing the unbonded particles. However, according to this embodiment, the occurrence of such a problem is also effectively prevented.

The water content (content of water) in the cellulosic member P10 obtained as mentioned above is preferably 5.0% by mass or less, more preferably 2.0% by mass or less, further more preferably 1.0% by mass or less.

When the water content is sufficiently low in this manner, the mechanical strength, durability, reliability, and the like of the cellulosic member P10 can be made particularly excellent. On the other hand, in the related art, in a shaped article produced using a cellulosic material, the water content could not be sufficiently reduced in this manner.

Second Embodiment

FIGS. 2A to 2F are cross-sectional views schematically showing respective steps according to a second embodiment of the production method for a cellulosic member. In the following description, different points from the above embodiment will be mainly described, and the description of the same matter will be omitted.

As shown in FIGS. 2A to 2F, the production method of this embodiment is configured as follows. The method includes a layer forming step (2a and 2c) in which a layer P1 having a given thickness is formed in a region surrounded by a side surface support section (a frame body) 45 using a composition P1' containing water and a cellulose derivative having an oxidizable/reducible functional group introduced thereinto, a reduction step (not shown) in which the oxidizable/reducible functional group of the cellulose derivative is reduced, and an ink application step (a pattern forming step) (2b and 2d) in which an ink P12 is applied to the layer P1 subjected to the reduction step by an inkjet method. After these steps are sequentially and repeatedly performed (2e), the method further includes an unbonded particle removal step (2f) in which among the particle bodies constituting the respective layers P1, particle bodies which are not bonded to one another by the cellulose derivative (bonding agent) are removed.

In this manner, in this embodiment, a pattern in the form of a layer corresponding to a tangible part P13 of a cellulosic member P10 is formed by applying a binding liquid (ink P12) containing a binding agent to the layer P1 constituted by the material containing the cellulose derivative in a given shape.

According to this, the ejection stability of the ink P12 can be made particularly excellent while making the content of the cellulose derivative in the cellulosic member P10 particularly high, and for example, the productivity of the cellulosic member P10 can be made particularly excellent.

Further, for example, even in the case where the content of a coloring agent or the like in the ink P12 is increased, the ejection stability of the ink P12 can be made sufficiently high, and therefore, while making the productivity of the cellulosic member P10 sufficiently high, various characteristics such as coloring density and coloring property of the cellulosic member P10 can be made particularly excellent.

Layer Forming Step

In the layer forming step, a layer P1 having a given thickness is formed using a composition (a three-dimensional shaping composition) P1' containing water and a cellulose derivative having an oxidizable/reducible functional group introduced thereinto is formed (2a and 2c).

In the composition P1', the cellulose derivative may be contained as a component constituting the particle bodies, or may be contained as a molten component.

In the case where the cellulose derivative is contained as a molten component in the composition P1', the composition P1' contains at least another component as the particle bodies.

Reduction Step

In this embodiment, prior to the ink application step, the cellulose derivative contained in the composition P1' constituting the layer P1 is reduced. That is, the oxidizable/reducible functional group of the cellulose derivative is changed from an oxidized state to a reduced state.

According to this, the cellulose derivative changes from a high hydrophilic state to a low hydrophilic state (a high hydrophobic state). As a result, water contained in the layer P1 easily moves to the outside of the layer P1. As a result, water is removed from the layer P1.

In this manner, by removing water from the layer P1 by utilizing a reduction reaction, a bonded part (tangible part) P13 which is formed in a later step is less likely to be adversely affected by the existence of water. Further, since the oxidizable/reducible functional group of the cellulose derivative is in a reduced state, the ex-post absorption of water can be effectively prevented and suppressed. As a result, the advantageous characteristics intrinsically possessed by cellulose are easily exhibited, and thus, the finally obtained cellulosic member P10 has excellent mechanical strength, durability, and the like.

The reduction step may be performed after the formation of the layer is completed by the completion of the layer forming step, or may be performed concurrently with the layer forming step for at least a partial region. That is, when the composition P1' is applied to a region where the layer P1 is formed, by heating the region where the layer P1 is formed or the like, the formation of the layer P1 and the reduction reaction of the cellulose derivative may be performed concurrently.

It is preferred to perform this step (reduction step) while performing a treatment of removing water (a drying treatment).

By doing this, the content of water in the finally obtained cellulosic member P10 can be particularly reduced.

Such a drying treatment can be performed by, for example, a heating treatment or a decompression treatment.

Incidentally, prior to the reduction step, a treatment of partially removing water contained in the layer P1 (a pre-drying treatment) may be performed.

By doing this, excessive water can be effectively prevented from rapidly coming to the surface of the layer P1 or the like after the reduction step, and thus, the productivity of the cellulosic member P10 can be made particularly excellent.

Further, after the reduction treatment, a treatment of removing water coming to the surface of the layer P1 (a post-drying treatment) may be performed.

Ink Application Step (Pattern Forming Step)

Thereafter, an ink P12 serving as a binding liquid which bonds the particle bodies contained in the layer P1 is applied to the layer P1 by an inkjet method (2b and 2d).

In this embodiment, when the ink P12 is applied in this step, water is favorably removed from the layer P1. Due to this, the ink P12 can be made to favorably move forward into a space (void) among the particle bodies constituting the layer P1, so that the binding strength due to the ink (binding liquid) P12 can be made particularly excellent. As a result, the mechanical strength, durability, reliability, and the like of the finally obtained cellulosic member P10 can be made particularly excellent.

The ink P12 to be used in this embodiment will be described in detail later, however, for example, an ink containing a curable resin such as a thermosetting resin or a photocurable resin as a binding agent can be favorably used.

In the case where the ink P12 contains a curable resin (a curable component), by performing a curing treatment for curing the curable resin after applying the ink P12, the ink P12 is solidified, and the bonded part (tangible part) P13 can be formed.

Further, in the case where the ink P12 contains a solvent, by volatilizing the solvent by heating or decompression, the ink P12 is solidified, whereby the bonded part (tangible part) P13 can be formed.

Unbonded Particle Removal Step

After the steps as mentioned above are performed repeatedly, as a post-treatment step, an unbonded particle removal step (2f) in which among the particle bodies constituting the respective layers P1, particle bodies which are not bonded to one another by the ink P12 (unbonded particles) are removed is performed. By doing this, the cellulosic member P10 is taken out.

This step can be performed in the same manner as described in the first embodiment.

Third Embodiment

FIGS. 3A to 3F are cross-sectional views schematically showing respective steps according to a third embodiment of the production method for a cellulosic member. In the following description, different points from the above embodiments will be mainly described, and the description of the same matter will be omitted.

As shown in FIGS. 3A to 3F, the production method of this embodiment is configured as follows. The method includes an ink application step (a pattern forming step) (3a and 3c) in which a tangible part forming ink P16' which contains water and a cellulose derivative having an oxidizable/reducible functional group introduced thereinto and is used for forming a tangible part P16 and a support section forming ink P17' which is used for forming a support section P17 for supporting the tangible part P16 are ejected in a given pattern by an inkjet method, and a reduction step (3b and 3d) in which the oxidizable/reducible functional group of the cellulose derivative is reduced. These steps are sequentially and repeatedly performed, thereby obtaining a temporary molded body P10' (3e), and thereafter, the method further includes a support section removal step (3f) in which the support section P17 is removed.

In this manner, in this embodiment, by the ink application step and the reduction step, the layer P1 is formed. That is, in this embodiment, a layer forming step includes the ink application step and the reduction step.

In this manner, in this embodiment, the layer is formed using the ink ejected by an inkjet method as the composition for forming the layer without forming a layer while flattening a particle body-containing composition by a flattening unit.

According to this, the composition can be selectively applied to a necessary place of a shaping region (a region on a stage 41), and therefore, the wasting of the material in the production of the cellulosic member P10 can be prevented and suppressed. Due to this, this is advantageous from the viewpoint of reduction in the production cost of the cellulosic member P10 and resource saving. Further, the number of steps can be reduced as a whole, and also a treatment such as recovery of the material or the like can be omitted or simplified, and thus, the productivity of the cellulosic member P10 can be made particularly excellent.

Hereinafter, the respective steps will be described.

Ink Application Step (Pattern Forming Step)

In the ink application step, a tangible part forming ink P16' containing a cellulose derivative having an oxidizable/reducible functional group introduced thereinto and a support section forming ink P17' containing a curable resin (a curable component) are ejected in a given pattern by an inkjet method (3a and 3c).

More specifically, the tangible part forming ink P16' is applied to a region which is to become the tangible part P16 of the cellulosic member P10, and the support section forming ink P17' is applied to a region which is adjacent to a region which is to become the outermost layer of the tangible part P16 of the cellulosic member P10 and on the surface side of the outermost layer.

In the first ink application step, on the stage 41, the inks (the tangible part forming ink P16' and the support section forming ink P17') are ejected (3a), and in each ink application step after the first ink application step, on the layer P1, the inks (the tangible part forming ink P16' and the support section forming ink P17') are ejected (3c).

In this manner, in this embodiment, not only the ink (the tangible part forming ink P16') is applied to the region which is to become the tangible part P16 of the cellulosic member P10, but also the ink (the support section forming ink P17') is applied to the surface side thereof.

According to this, by forming the support section P17 by applying the support section forming ink P17', even if a layer constituting the cellulosic member P10 (for example, the second layer) has a region protruding from the outer peripheral portion of the layer (for example, the first layer) lower than this layer (for example, in the drawing, a relationship between the first layer and the second layer from the bottom, a relationship between the second layer and the third layer from the bottom, a relationship between the fifth layer and the sixth layer from the bottom, and a relationship between the sixth layer and the seventh layer from the bottom), the support section P17 of the lower layer (the first layer) can favorably support the tangible part forming ink P16' for forming the upper layer (the second layer). Due to this, undesirable deformation (particularly, sagging or the like) of the tangible part P16 can be favorably prevented, and thus, the dimensional accuracy of the finally obtained cellulosic member P10 can be made particularly excellent.

Further, in this step, the inks (the tangible part forming ink P16' and the support section forming ink P17') are applied by an inkjet method, and therefore, even if the pattern in which the inks (the tangible part forming ink P16' and the support section forming ink P17') are applied has a fine shape, the inks can be applied with high reproducibility. As a result, the dimensional accuracy of the finally obtained cellulosic member P10 can be made particularly high, and also the control of the surface shape and appearance of the cellulosic member P10 can be favorably performed.

The tangible part forming ink P16' and the support section forming ink P17' will be described in detail later.

The amount of the ink to be applied in this step is not particularly limited, but is preferably such that the thickness of the layer P1 to be formed in the subsequent reduction step becomes 30 µm or more and 500 µm or less, more preferably 70 µm or more and 150 µm or less.

According to this, while making the productivity of the cellulosic member P10 sufficiently high, the occurrence of undesirable irregularities or the like in the cellulosic member P10 to be produced is more effectively prevented, and the dimensional accuracy of the cellulosic member P10 can be made particularly excellent. Further, the surface state and appearance of the finally obtained cellulosic member P10 can be more favorably controlled.

Reduction Step

After the inks (the tangible part forming ink P16' and the support section forming ink P17') are applied (ejected) in the ink application step, the cellulose derivative constituting the tangible part forming ink P16' is reduced and also the curable component (curable resin) contained in the support section forming ink P17' is cured (3b and 3d). By doing this, the layer P1 having the tangible part P16 and the support section P17 is obtained. That is, the region to which the tangible part forming ink P16' is applied becomes the tangible part P16, and the region to which the support section forming ink P17' is applied becomes the support section P17.

By reducing the cellulose derivative constituting the tangible part forming ink P16', the cellulose derivative changes from a high hydrophilic state to a low hydrophilic state (a high hydrophobic state). As a result, water contained in the tangible part forming ink P16' easily moves to the outside of the pattern formed by the tangible part forming ink P16'. As a result, water is removed from the pattern formed by the tangible part forming ink P16', and thus, the tangible part P16 in a solidified state is formed (3b and 3d).

The curing of the curable component (curable resin) contained in the support section forming ink P17' is performed by a method in accordance with the type of the curable component. For example, in the case where the curable component contained in the support section forming ink P17' is a thermosetting resin, the curing is performed by heating, and in the case where the curable component contained in the support section forming ink P17' is a photocurable resin, the curing is performed by light irradiation.

In this step, it is not necessary to completely cure the curable component contained in the support section forming ink P17', and the support section forming ink P17' may be in an incompletely cured state at the end of this step. By doing this, the support section removal step, which will be described in detail later, can be easily performed, and the productivity of the cellulosic member P10 can be further improved.

It is preferred to perform this step (reduction step) while performing a treatment of removing water (a drying treatment).

By doing this, the content of water in the finally obtained cellulosic member P10 can be particularly reduced.

Such a drying treatment can be performed by, for example, a heating treatment or a decompression treatment.

Incidentally, prior to the reduction step, a treatment of partially removing water contained in the tangible part forming ink P16' (a pre-drying treatment) may be performed.

By doing this, excessive water can be effectively prevented from rapidly coming to the surface of the layer P1 or the like after the reduction step, and thus, the productivity of the cellulosic member P10 can be made particularly excellent.

Further, after the reduction treatment, a treatment of removing water coming to the surface of the layer P1 (a post-drying treatment) may be performed.

Support Section Removal Step

After the series of steps as mentioned above are performed repeatedly, the support section P17 is removed (3f). By doing this, the cellulosic member P10 is obtained.

Examples of a method for removing the support section P17 include a method in which the support section P17 is selectively dissolved and removed using a liquid which selectively dissolves the support section P17, and a method in which a liquid for which the support section P17 has higher absorbability than the tangible part P16 is used and the support section P17 is made to selectively absorb the liquid to swell the support section P17, or to decrease the mechanical strength of the support section P17, and then, the support section P17 is detached or disrupted.

The liquid to be used in this step varies depending on the constituent materials or the like of the tangible part P16 and the support section P17, however, for example, water, an alcohol such as methanol, ethanol, isopropyl alcohol, n-propyl alcohol, butanol, or isobutanol, glycerin, or a glycol such as ethylene glycol, diethylene glycol, triethylene glycol, propylene glycol, or dipropylene glycol can be used. The liquid contains at least one member selected from these, and may be a mixture with a water-soluble substance which generates a hydroxide ion such as sodium hydroxide, potassium hydroxide, sodium hydrogen carbonate, or an organic amine for increasing the solubility of the support section, a surfactant which facilitates the separation of the detached support section, or the like.

A method for applying the liquid to the temporary molded body P10' is not particularly limited, and for example, a soaking method, a spraying method, a coating method, a variety of printing methods, and the like can be adopted.

In the above description, it is described that the liquid is used in the step, however, a substance having the same function (for example, a solid, a gas, a supercritical fluid, or the like) may be used.

Further, when or after the liquid is applied, ultrasonic vibration may be applied.

By doing this, the removal of the support section P17 can be accelerated, and thus, the productivity of the cellulosic member P10 can be made particularly excellent.

In the above description, it is described that the support section forming ink P17' is applied so as to come in contact with the tangible part forming ink P16' in the entire region which is to become the outermost layer of the cellulosic member P10, however, the support section forming ink P17' may be applied so as to come in contact with the tangible part forming ink P16' only in a part of the region which is to become the outermost layer of the cellulosic member P10. Further, in the case where the cellulosic member P10 to be produced has a shape which can be produced without forming the support section P17, the support section forming ink P17' may not be used.

In the case where the formation of the support section is not needed due to the shape of the cellulosic member P10 to be produced, the layer P1 may be formed using only the tangible part forming ink.

Cellulosic Member Production Device

Next, a production device (a cellulosic member production device) which can be used for producing a cellulosic member will be described.

First Embodiment

Figure 4:
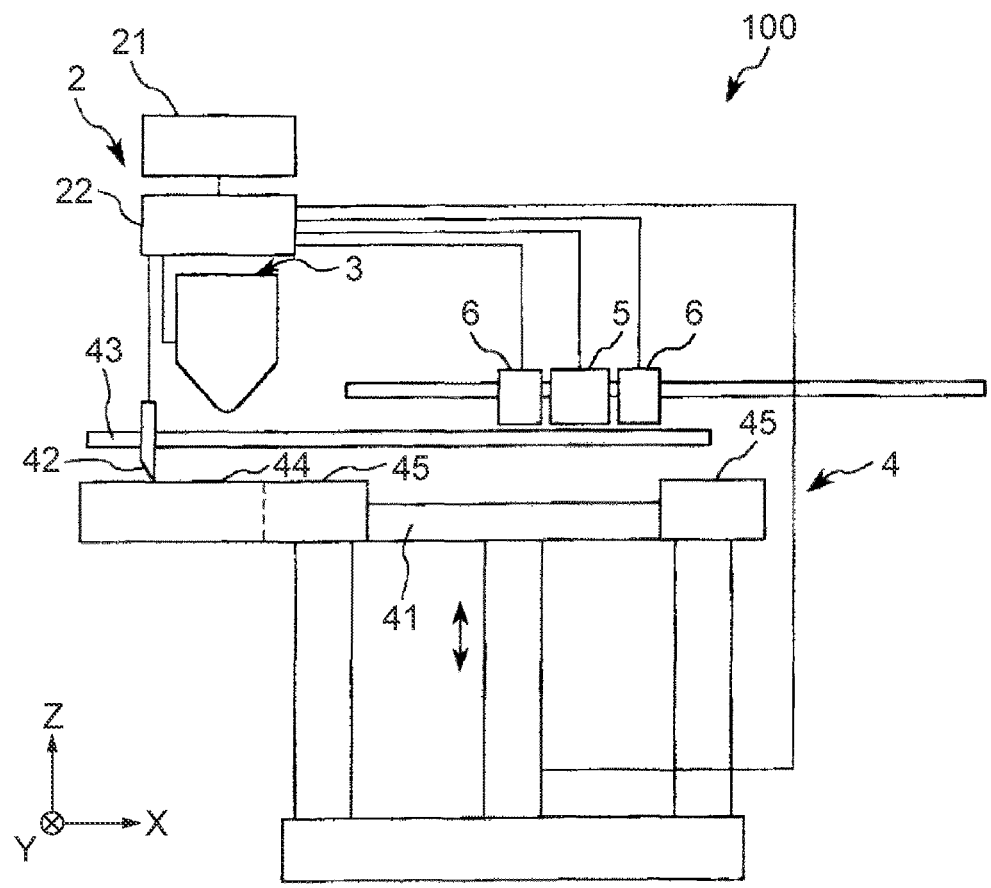
FIG. 4 is a cross-sectional view schematically showing a first embodiment of a production device to be used for producing a cellulosic member.

FIG. 4 is a cross-sectional view schematically showing a first embodiment of the production device to be used for producing a cellulosic member.

The cellulosic member production device of this embodiment can be preferably applied to the production method of the first embodiment and the production method of the second embodiment mentioned above.

A cellulosic member production device 100 shown in FIG. 4 produces a cellulosic member P10 by repeatedly molding a layer P1 using a particle body-containing composition (a three-dimensional shaping composition) P1', and stacking the formed layers P1.

As shown in FIG. 4, the cellulosic member production device 100 includes a control section 2, a composition supply section 3 which stores the particle body-containing composition P1', a layer forming section 4 which forms the layer P1 using the composition P1' supplied from the composition supply section 3, an ink ejection section (an ink application unit) 5 which ejects an ink P12 as a cellulosic material (a cellulosic composition) to the layer P1, and a solidification unit 6 for solidifying the ink P12. Further, for example, in the case where the reduction of a cellulose derivative is performed by a reduction reaction using a reducing agent, and the reducing agent is applied in an ex-post manner (in the production method of the first embodiment, after a pattern is formed with the ink P12, and in the production method of the second embodiment, after the layer P1 is formed), the cellulosic member production device 100 includes a reducing agent application unit (not shown).

The control section 2 includes a computer 21 and a drive control section 22.

The computer 21 is a common desk top computer configured to include a CPU, a memory, etc. therein, or the like. The computer 21 digitizes the shape of the cellulosic member P10 as model data, and outputs cross-sectional data (slice data) obtained by slicing the cellulosic member P10 into multiple parallel layers of thin cross sections to the drive control section 22.

The drive control section 22 functions as a control unit for individually driving the layer forming section 4, the ink ejection section 5, and the solidification unit 6. Specifically, for example, the drive control section 22 controls the ejection pattern and the ejection amount of the ink P12 by the ink ejection section 5, the supply amount of the composition P1' from the composition supply section 3, the descent amount of a stage 41, and the like.

The composition supply section 3 is configured to move under the command of the drive control section 22 and supply the composition P1' stored therein to a composition temporary placing section 44.

The layer forming section 4 includes the composition temporary placing section 44 which temporarily holds the composition P1' supplied from the composition supply section 3, a squeegee (a flattening unit) 42 which forms a layer P1 while flattening the composition P1' held by the composition temporary placing section 44, a guide rail 43 which regulates the movement of the squeegee 42, the stage 41 which supports the formed layer P1, and a side surface support section (a frame body) 45 which surrounds the stage 41.

When a new layer P1 is formed on a previously formed layer P1, the previously formed layer P1 is moved relatively downward with respect to the side surface support section 45. By doing this, the thickness of the newly formed layer P1 is defined.

In particular, in this embodiment, when a new layer P1 is formed on a previously formed layer P1, the stage 41 sequentially descends by a given amount under the command of the drive control section 22. In this manner, since the stage 41 is configured to be able to move in the Z direction (vertical direction), the number of members to be moved for adjusting the thickness of the layer P1 when the new layer P1 is formed can be decreased, and therefore, the structure of the cellulosic member production device 100 can be further simplified.

The stage 41 has a flat surface (a region to which the composition P1' is applied).

According to this, the layer P1 having a highly uniform thickness can be easily and reliably formed. Further, in the cellulosic member P10 to be produced, the occurrence of undesirable deformation or the like can be effectively prevented.

The stage 41 is preferably constituted by a material with a high strength. Examples of the constituent material of the stage 41 include various metal materials such as stainless steel.

Further, the surface (the region to which the composition P1' is applied) of the stage 41 may be subjected to a surface treatment. By doing this, for example, the adhesion of the constituent material of the composition P1' or the constituent material of the ink P12 to the stage 41 is more effectively prevented, or the durability of the stage 41 is made particularly excellent, and thus, the stable production of the cellulosic member P10 can be achieved for a longer period of time. Examples of a material to be used for the surface treatment of the surface of the stage 41 include fluororesins such as polytetrafluoroethylene.

The squeegee 42 has an elongate shape extending in the Y direction and includes a blade having a sharp edge shape at a lower tip end.

The length of the blade in the Y direction is equal to or longer than the width (the length in the Y direction) of the stage 41 (shaping region).

The cellulosic member production device 100 may include a vibration mechanism (not shown) for giving a small vibration to the blade so as to smoothly diffuse the composition P1' with the squeegee 42.

The side surface support section 45 has a function to support the side surface of the layer P1 formed on the stage 41. The side surface support section 45 also has a function to define the area of the layer P1 when forming the layer P1.

Further, a surface (a region which can come in contact with the composition P1') of the side surface support section 45 may be subjected to a surface treatment. By doing this, for example, the adhesion of the constituent material of the composition P1' or the constituent material of the ink P12 to the side surface support section 45 is more effectively prevented, or the durability of the side surface support section 45 is made particularly excellent, and thus, the stable production of the cellulosic member P10 can be achieved for a longer period of time. Further, when the previously formed layer P1 is moved relatively downward with respect to the side surface support section 45, the occurrence of an undesirable disturbance of the layer P1 can be effectively prevented. As a result, the dimensional accuracy and reliability of the finally obtained cellulosic member P10 can be made particularly excellent. Examples of a material to be used for the surface treatment of the surface of the side surface support section 45 include fluororesins such as polytetrafluoroethylene.

The ink application unit (ink ejection section) 5 applies the ink P12 to the layer P1.

By including such an ink application unit 5, the mechanical strength of the cellulosic member P10 can be easily and reliably made excellent.

In particular, in this embodiment, the ink application unit 5 is an ink ejection section which ejects the ink P12 by an inkjet method.

According to this, the ink P12 can be applied in a fine pattern, and even if the cellulosic member P10 has a fine structure, the cellulosic member P10 can be produced with particularly high productivity.

As a liquid droplet ejection system (a system of the inkjet method), a piezo system, a system for ejecting the ink P12 by bubbles generated by heating the ink P12, or the like can be used, however, from the viewpoint of difficulty in denaturation of the constituent components of the ink P12 or the like, a piezo system is preferred.

In the ink ejection section (the ink application unit) 5, the pattern to be formed for each layer P1 and the amount of the ink P12 to be applied to each region of the layer P1 are controlled under the command of the drive control section 22. The ejection pattern, the ejection amount, and the like of the ink P12 by the ink ejection section (the ink application unit) 5 are determined based on the slice data.

The solidification unit 6 solidifies the ink P12, and for example, an energy ray irradiation unit for performing irradiation with an energy ray (for example, a ray such as an ultraviolet ray, an infrared ray, or a visible ray, an electron beam, a positron beam, a neutron beam, an α beam, an ion beam, etc.), a heating unit such as a hot plate or a hot air supply unit, or the like can be used.

Second Embodiment

Next, a second embodiment of the cellulosic member production device will be described.

The cellulosic member production device of this embodiment can be favorably applied to the production method of the third embodiment mentioned above.

Figure 5:
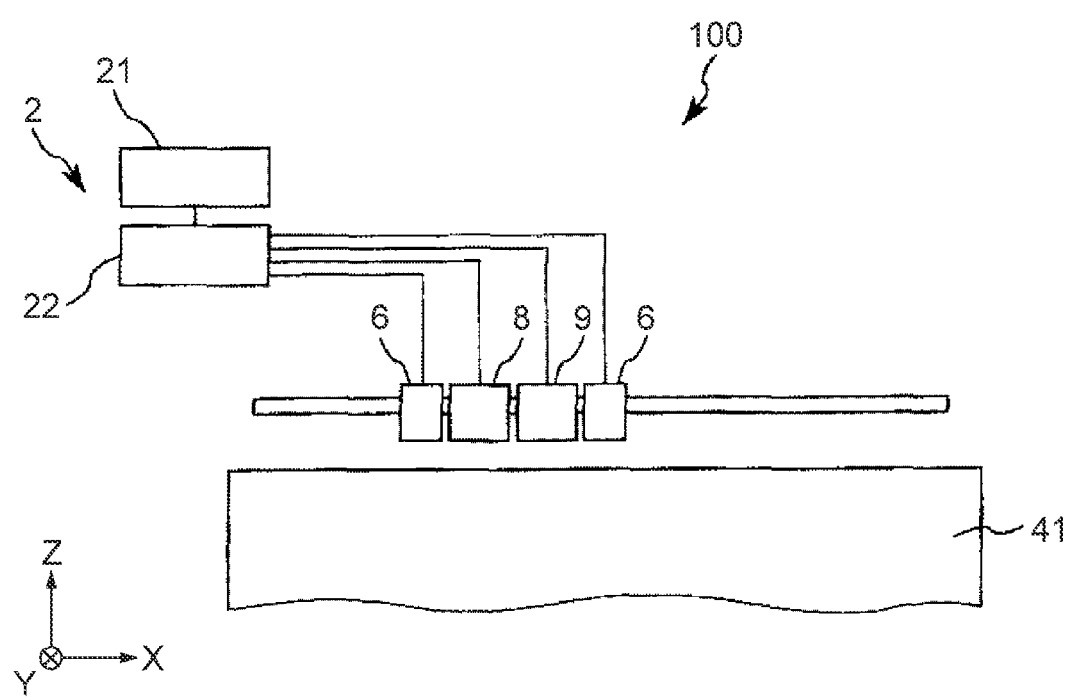
FIG. 5 is a cross-sectional view schematically showing a second embodiment of a production device to be used for producing a cellulosic member.

FIG. 5 is a cross-sectional view schematically showing a second embodiment of the production device to be used for producing a cellulosic member. In the following description, different points from the above embodiment will be mainly described, and the description of the same matter will be omitted.

A cellulosic member production device 100 produces a cellulosic member P10 by repeatedly molding a layer P1 using a tangible part forming ink P16' and a support section forming ink P17', and stacking the formed layers P1.

As shown in FIG. 5, the cellulosic member production device 100 includes a control section 2, a stage 41, a tangible part forming ink application unit 8 which ejects the tangible part forming ink P16', a support section forming ink application unit 9 which ejects the support section forming ink P17', and a solidification unit 6 for solidifying (curing) the tangible part forming ink P16' and the support section forming ink P17'.

The tangible part forming ink application unit 8 ejects the tangible part forming ink P16' by an inkjet method.

By including such a tangible part forming ink application unit 8, the tangible part forming ink P16' can be applied in a desired amount to a desired region in a fine pattern, and thus, even if the cellulosic member P10 has a fine structure, the cellulosic member P10 can be produced with particularly high productivity.

As a liquid droplet ejection system (a system of the inkjet method), a piezo system, a system for ejecting the ink by bubbles generated by heating the ink, or the like can be used, however, from the viewpoint of difficulty in denaturation of the constituent components of the ink or the like, a piezo system is preferred.

In the tangible part forming ink application unit 8, the pattern to be formed, the amount of the tangible part forming ink P16' to be applied, and the like are controlled under the command of the drive control section 22. The ejection pattern, the ejection amount, and the like of the tangible part forming ink P16' by the tangible part forming ink application unit 8 are determined based on the slice data.

According to this, a necessary and sufficient amount of the tangible part forming ink P16' can be applied to a target region, and thus, the tangible part P16 in a desired pattern can be reliably formed, and the dimensional accuracy and the mechanical strength of the cellulosic member P10 can be more reliably made excellent. Further, in the case where the tangible part forming ink P16' contains a coloring agent, a desired color tone, design, and the like can be reliably obtained.

The tangible part forming ink application unit 8 can relatively move in the X and Y directions with respect to the stage, and also can move in the Z direction.

According to this, even when the layers P1 are stacked, a distance between a nozzle surface (a tip end of an ejection section) of the tangible part forming ink application unit 8 and a place where the tangible part forming ink P16' lands can be kept at a predetermined value.

The support section forming ink application unit 9 ejects the support section forming ink P17' by an inkjet method.

By including such a support section forming ink application unit 9, the support section forming ink P17' can be applied in a desired amount to a desired region in a fine pattern, and thus, even if the cellulosic member P10 to be produced has a fine structure, the support section P17 having a desired size and a desired shape can be formed in a desired region, and the surface shape and appearance of the cellulosic member P10 can be more reliably controlled. Further, the productivity of the cellulosic member P10 can be made particularly excellent.

A liquid droplet ejection system (a system of the inkjet method), controlling, driving, etc. for the support section forming ink application unit 9 are the same as those for the tangible part forming ink application unit 8 mentioned above.

Although not shown in the drawing, the cellulosic member production device 100 may include a support section removal unit for removing the support section P17, a drying unit for drying the cellulosic member P10 after removing the support section P17.

Examples of the support section removal unit include a unit which mechanically disrupts and removes the support section P17, a tank which stores a liquid as mentioned above and soaks a temporary molded body P10', a liquid spraying unit which sprays a liquid as mentioned above onto the temporary molded body P10', and a liquid application unit which applies a liquid as mentioned above to a temporary molded body P10'.

Examples of the drying unit include a unit which supplies a heated gas or a dried gas as mentioned above and a decompression unit which decompresses a space in which the cellulosic member P10 is placed.

Further, the cellulosic member production device may perform only a part of the above-mentioned steps, and a part of the above-mentioned steps may be performed without using the cellulosic member production device.

Materials to be Used for Production of Cellulosic Member

Hereinafter, materials to be used in the production method for a cellulosic member mentioned above will be described for each of the above-mentioned embodiments of the production method.

First Embodiment

In the production method of the first embodiment, as the materials for producing the cellulosic member, the ink P12 and the composition P1' are used.

Ink P12 (Ink Containing Cellulose Derivative)

Hereinafter, the ink P12 to be used in the production method of the first embodiment mentioned above will be described in detail.

The ink P12 is the cellulosic material (cellulosic composition) according to the invention, and contains the cellulose derivative having the oxidizable/reducible functional group introduced thereinto.

In particular, in this embodiment, the ink P12 contains water and the cellulose derivative having the oxidizable/reducible functional group in an oxidized state introduced thereinto.

According to this, while making the handleability (for example, the ejection stability by an inkjet method, etc.) of the ink P12 excellent, the cellulosic member P10 to be produced sufficiently exhibits the advantageous characteristics intrinsically possessed by cellulose (for example, high strength, light weight, biosafety, environmental safety, etc.), and thus has excellent mechanical strength, durability, reliability, and the like.

Cellulose Derivative

The cellulose derivative contained in the ink P12 preferably satisfies the conditions as mentioned above.

In the ink P12, the cellulose derivative is preferably dissolved in water.

According to this, an undesirable variation in the composition in the ink P12 can be effectively prevented. Further, for example, the ejection stability and the like of the ink P12 by an inkjet method can be made particularly excellent. As a result, the cellulosic member P10 can be stably produced over a long period of time.

The content of the cellulose derivative in the ink P12 is not particularly limited, but is preferably 30% by mass or more, more preferably 40% by mass or more and 90% by mass or less, further more preferably 45% by mass or more and 85% by mass or less with respect to the total content of solid components contained in the ink P12 (all the components to be contained in the cellulosic member P10).

According to this, while making the storage stability, ejection stability, and the like of the ink P12 excellent, the durability, strength, and reliability of the cellulosic member P10 to be produced can be made particularly excellent.

In the ink P12, the cellulose derivative may be in a dissolved state or in a dispersed state or in a mixed state of these states.

In the case where the cellulose derivative is dispersed in the ink P12, the average particle diameter of the cellulose derivative in the ink P12 is not particularly limited, but is preferably 5.0 µm or less, more preferably 1.0 µm or less.

According to this, while making the storage stability, ejection stability, and the like of the ink P12 excellent, the durability, strength, and reliability of the cellulosic member P10 to be produced can be made particularly excellent.

Water

The ink P12 contains water in addition to the cellulose derivative as mentioned above.

According to this, the fluidity of the ink P12 can be made excellent, and thus, the application of the ink P12 by an inkjet method can be favorably performed.

The content of water in the ink P12 is not particularly limited, but is preferably 10% by mass or more and 70% by mass or less, more preferably 20% by mass or more and 50% by mass or less.

According to this, while making the ejection stability of the ink P12 more excellent, the solvent can be removed more rapidly after the ink P12 is applied, and therefore, the productivity of the cellulosic member P10 can be made particularly excellent.

Another Bonding Agent

In this embodiment, the cellulose derivative functions as a bonding agent, and according to this, the mechanical strength and the like of the cellulosic member P10 can be made excellent, however, the ink P12 may further contain another bonding agent.

Examples of the another bonding agent include a thermoplastic resin; a thermosetting resin; various photocurable resins such as a visible light curable resin which is cured by a light in the visible light range (a photocurable resin in a narrow sense), a UV curable resin, and an IR curable resin; and an X-ray curable resin, and one bonding agent or a combination of two or more bonding agents selected from these can be used. Above all, from the viewpoint of the mechanical strength of the cellulosic member P10 to be obtained, the productivity of the cellulosic member P10, and the like, the another bonding agent is preferably a bonding agent containing a curable resin. Further, among the various curable resins, from the viewpoint of the mechanical strength of the cellulosic member P10 to be obtained, the productivity of the cellulosic member P10, the storage stability of the ink P12, and the like, particularly, a UV curable resin (a polymerizable compound) is preferred.

As the UV curable resin (polymerizable compound), a compound whose addition polymerization or ring-opening polymerization is initiated by a radical species, a cationic species, or the like generated from a photopolymerization initiator by UV irradiation, thereby forming a polymer is preferably used. Examples of the polymerization form of the addition polymerization include radical, cationic, anionic, metathesis, and coordination polymerization. Further, examples of the polymerization form of the ring-opening polymerization include cationic, anionic, radical, metathesis, and coordination polymerization.

Examples of the addition polymerizable compound include compounds having at least one ethylenically unsaturated double bond. As the addition polymerizable compound, a compound having at least one, preferably two or more terminal ethylenically unsaturated bonds can be preferably used.

An ethylenically unsaturated polymerizable compound has a chemical form of a monofunctional polymerizable compound, a polyfunctional polymerizable compound, or a mixture of these compounds.

Examples of the monofunctional polymerizable compound include unsaturated carboxylic acids (for example, acrylic acid, methacrylic acid, itaconic acid, crotonic acid, isocrotonic acid, maleic acid, etc.) and esters thereof, and amides thereof.

As the polyfunctional polymerizable compound, an ester of an unsaturated carboxylic acid with an aliphatic polyhydric alcohol compound or an amide of an unsaturated carboxylic acid with an aliphatic polyvalent amine compound is used.

Further, an addition reaction product of an ester or an amide of an unsaturated carboxylic acid having a hydroxyl group or a nucleophilic substituent such as an amino group or a mercapto group with an isocyanate or an epoxy, a dehydration condensation reaction product with a carboxylic acid, or the like can also be used. Further, an addition reaction product of an ester or an amide of an unsaturated carboxylic acid having an electrophilic substituent such as an isocyanate group or an epoxy group with an alcohol, an amine, or a thiol, further, a substitution reaction product of an ester or an amide of an unsaturated carboxylic acid having a leaving substituent such as a halogen group or a tosyloxy group with an alcohol, an amine, or a thiol can also be used.

For example, a (meth)acrylate ester is representative of a specific example of the radical polymerizable compound which is the ester of an unsaturated carboxylic acid with an aliphatic polyhydric alcohol compound, and either of a monofunctional (meth)acrylate and a polyfunctional (meth)acrylate can be used.

Specific examples of the monofunctional (meth)acrylate include tolyloxyethyl (meth)acrylate, phenyloxyethyl (meth)acrylate, cyclohexyl (meth)acrylate, ethyl (meth)acrylate, methyl (meth)acrylate, isobornyl (meth)acrylate, and tetrahydrofurfuryl (meth)acrylate.

Specific examples of a difunctional (meth)acrylate include ethylene glycol di(meth)acrylate, triethylene glycol di(meth)acrylate, 1,3-butanediol di(meth)acrylate, tetramethylene glycol di(meth)acrylate, propylene glycol di(meth)acrylate, neopentyl glycol di(meth)acrylate, hexanediol di(meth)acrylate, 1,4-cyclohexanediol di(meth)acrylate, tetraethylene glycol di(meth)acrylate, pentaerythritol di(meth)acrylate, and dipentaerythritol di(meth)acrylate.

Specific examples of a trifunctional (meth)acrylate include trimethylolpropane tri(meth)acrylate, trimethylolethane tri(meth)acrylate, alkylene oxide-modified tri(meth)acrylate of trimethylolpropane, pentaerythritol tri(meth)acrylate, dipentaerythritol tri(meth)acrylate, trimethylolpropane tri((meth)acryloyloxypropyl) ether, isocyanuric acid alkylene oxide-modified tri(meth)acrylate, propionic acid dipentaerythritol tri(meth)acrylate, tri((meth)acryloyloxyethyl) isocyanurate, hydroxypivalaldehyde-modified dimethylolpropane tri(meth)acrylate, and sorbitol tri(meth)acrylate.

Specific examples of a tetrafunctional (meth)acrylate include pentaerythritol tetra(meth)acrylate, sorbitol tetra(meth)acrylate, ditrimethylolpropane tetra(meth)acrylate, propionic acid dipentaerythritol tetra(meth)acrylate, and ethoxylated pentaerythritol tetra(meth)acrylate.

Specific examples of a pentafunctional (meth)acrylate include sorbitol penta(meth)acrylate and dipentaerythritol penta(meth)acrylate.

Specific examples of a hexafunctional (meth)acrylate include dipentaerythritol hexa(meth)acrylate, sorbitol hexa(meth)acrylate, alkylene oxide-modified hexa(meth)acrylate of phosphazene, and caprolactone-modified dipentaerythritol hexa(meth)acrylate.

Examples of the polymerizable compound other than (meth)acrylates include itaconate esters, crotonate esters, isocrotonate esters, and maleate esters.

Examples of the itaconate esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of the crotonate esters include ethylene glycol dicrotonate, tetramethylene glycol dicrotonate, pentaerythritol dicrotonate, and sorbitol tetradicrotonate.

Examples of the isocrotonate esters include ethylene glycol diisocrotonate, pentaerythritol diisocrotonate, and sorbitol tetraisocrotonate.

Examples of the maleate esters include ethylene glycol dimaleate, triethylene glycol dimaleate, pentaerythritol dimaleate, and sorbitol tetramaleate.

As an example of another ester, for example, an aliphatic alcohol ester, an ester having an aromatic backbone, an ester containing an amino group, or the like can also be used.

Specific examples of a monomer of the amide of an unsaturated carboxylic acid with an aliphatic polyvalent amine compound include methylenebis-acrylamide, methylenebis-methacrylamide, 1,6-hexamethylenebis-acrylamide, 1,6-hexamethylenebis-methacrylamide, diethylenetriamine trisacrylamide, xylylene bisacrylamide, and xylylene bismethacrylamide.

Other preferred examples of an amide-based monomer include monomers having a cyclohexylene structure.

A urethane-based addition polymerizable compound which is produced by an addition reaction between an isocyanate and a hydroxy group is also preferred, and specific examples of such a compound include vinyl urethane compounds containing two or more polymerizable vinyl groups in one molecule obtained by adding a vinyl monomer containing a hydroxy group represented by the following formula (1) to a polyisocyanate compound having two or more isocyanate groups in one molecule.

$$CH_2=C(R^1)COOCH_2CH(R^2)OH \quad (1)$$

In the formula (1), $R^1$ and $R^2$ each independently represent H or $CH_3$.

In the invention, a cationic ring-opening polymerizable compound having at least one cyclic ether group such as an epoxy group or an oxetane group in the molecule can be favorably used as a UV curable resin (a polymerizable compound).

Examples of the cationic polymerizable compound include curable compounds containing a ring-opening polymerizable group, and among these, heterocyclic group-containing curable compounds are particularly preferred. Examples of such curable compounds include cyclic imino ethers such as epoxy derivatives, oxetane derivatives, tetrahydrofuran derivatives, cyclic lactone derivatives, cyclic carbonate derivatives, and oxazoline derivatives, and vinyl ethers, and among these, epoxy derivatives, oxetane derivatives, and vinyl ethers are preferred.

Preferred examples of the epoxy derivatives include monofunctional glycidyl ethers, polyfunctional glycidyl ethers, monofunctional alicyclic epoxies, and polyfunctional alicyclic epoxies.

Specific examples of compounds of the glycidyl ethers include diglycidyl ethers, (for example, ethylene glycol diglycidyl ether, bisphenol A diglycidyl ether, etc.), trifunctional or higher functional glycidyl ethers (for example, trimethylolethane triglycidyl ether, trimethylolpropane triglycidyl ether, glycerol triglycidyl ether, triglycidyl trishydroxyethyl isocyanurate, etc.), tetrafunctional or higher functional glycidyl ethers (for example, sorbitol tetraglycidyl ether, pentaerythritol tetraglycyl ether, polyglycidyl ethers of cresol novolac resins, polyglycidyl ethers of phenolnovolac resins, etc.), alicyclic epoxies (for example, Celloxide 2021P, Celloxide 2081, Epolead GT-301, and Epolead GT-401 (all are manufactured by Daicel Chemical Industries, Ltd.)), EHPE (manufactured by Daicel Chemical Industries, Ltd.), polycyclohexyl epoxy methyl ethers of phenol novolac resins, etc.), and oxetanes (for example, OX-SQ and PNOX-1009 (all are manufactured by Toagosei Co., Ltd.), etc.).

As the polymerizable compound, an alicyclic epoxy derivative can be preferably used. An "alicyclic epoxy group" refers to a partial structure in which a double bond of a cycloalkene ring of a cyclopentene group, a cyclohexene group, or the like is epoxidized with a suitable oxidizing agent such as hydrogen peroxide or a peroxy acid.

As the alicyclic epoxy compound, a polyfunctional alicyclic epoxy compound having two or more cyclohexene oxide groups or cyclopentene oxide groups in one molecule is preferred. Specific examples of the alicyclic epoxy compound include 4-vinylcyclohexene dioxide, (3,4-epoxycyclohexyl)methyl-3,4-epoxycyclohexylcarboxylate, di(3,4-epoxycyclohexyl) adipate, di(3,4-epoxycyclohexylmethyl) adipate, bis(2,3-epoxycyclopentyl) ether, di(2,3-epoxy-6-methylcyclohexylmethyl) adipate, and dicyclopentadiene dioxide.

A normal glycidyl compound having an epoxy group but having no alicyclic structure in the molecule can be used alone or can also be used in combination with the above-mentioned alicyclic epoxy compound.

Examples of such a normal glycidyl compound include a glycidyl ether compound and a glycidyl ester compound, but it is preferred to use a glycidyl ether compound in combination.

Specific examples of the glycidyl ether compound include aromatic glycidyl ether compounds such as 1,3-bis(2,3-epoxypropyloxy)benzene, a bisphenol A type epoxy resin, a bisphenol F type epoxy resin, a phenol novolac type epoxy resin, a cresol novolac type epoxy resin, and a trisphenol methane type epoxy resin; and aliphatic glycidyl ether compounds such as 1,4-butanediol glycidyl ether, glycerol triglycidyl ether, propylene glycol diglycidyl ether, and trimethylolpropane tritriglycidyl ether. Examples of the glycidyl ester include glycidyl esters of linoleic acid dimers.

As the polymerizable compound, a compound having an oxetanyl group, which is a four-membered cyclic ether (hereinafter also simply referred to as "oxetane compound") can be used. The oxetanyl group-containing compound is a compound having one or more oxetanyl groups in one molecule.

The content of the another bonding agent in the ink P12 is preferably 1% by mass or more and 40% by mass or less, more preferably 2% by mass or more and 30% by mass or less with respect to the total content of solid components contained in the ink P12 (all the components to be contained in the cellulosic member P10).

According to this, by including the another bonding agent, the synergistic effect of the cellulose derivative and the another bonding agent is exhibited while more remarkably exhibiting the effect of including the cellulose derivative as mentioned above, and the mechanical strength of the finally obtained cellulosic member P10 can be made particularly excellent.

Another Component

The ink P12 may contain a component (another component) other than the above-mentioned components. Examples of such a component include various coloring agents such as a pigments and a dye, various fluorescent materials, various light storage materials, various phosphorescent materials, an infrared absorbing material, a dispersant, a surfactant, a polymerization initiator, a polymerization accelerator, a crosslinking agent, a permeation accelerator, a wetting agent (a humectant), a fixing agent, an antifungal agent, a preservative, an antioxidant, a siloxane compound, a reducing agent, a solvent other than water, a UV absorbing agent, a chelating agent, a pH adjusting agent, a thickening agent, a filler, an anti-aggregation agent, and a defoaming agent.

In particular, by including a coloring agent in the ink P12, the cellulosic member P10 colored in a color corresponding to the color of the coloring agent can be obtained.

In particular, by including a pigment as the coloring agent, the light resistance of the ink P12 and the cellulosic member P10 can be made favorable. As the pigment, either of an inorganic pigment and an organic pigment can be used.

Examples of the inorganic pigment include carbon blacks (C.I. Pigment Black 7) such as Furnace Black, Lamp Black, Acetylene Black, and Channel Black, iron oxide, and titanium oxide, and one pigment or a combination of two or more pigments selected from these can be used.

Among the inorganic pigments, in order to take on a preferred white color, titanium oxide is preferred.

Examples of the organic pigment include azo pigments such as insoluble azo pigments, condensed azo pigments, azo lakes, and chelate azo pigments, polycyclic pigments such as phthalocyanine pigments, perylene and perinone pigments, anthraquinone pigments, quinacridone pigments, dioxane pigments, thioindigo pigments, isoindolinone pigments, and quinophthalone pigments, dye chelates (for example, basic dye type chelates, acidic dye type chelates, etc.), dye lakes (basic dye type lakes and acidic dye type lakes), nitro pigments, nitroso pigments, and aniline black, and one pigment or a combination of two or more pigments selected from these can be used.

More specifically, examples of the carbon black to be used as a black pigment include No. 2300, No. 900, MCF88, No. 33, No. 40, No. 45, No. 52, MA7, MA8, MA100, No. 2200B, etc. (all are manufactured by Mitsubishi Chemical Corporation), Raven 5750, Raven 5250, Raven 5000, Raven 3500, Raven 1255, Raven 700, etc. (all are manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, etc. (all are manufactured by CABOT JAPAN K.K.), and Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, Special Black 4, etc. (all are manufactured by Degussa GmbH).

Examples of a white pigment include C.I. Pigment White 6, 18, and 21.

Examples of a yellow pigment include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of a magenta pigment include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violet 19, 23, 32, 33, 36, 38, 43, and 50.

Examples of a cyan pigment include C.I. Pigment Blue 1, 2, 3, 15, 15:1, 15:2, 15:3, 15:34, 15:4, 16, 18, 22, 25, 60, 65, and 66 and C.I. Vat Blue 4 and 60.

Examples of a pigment other than the above-mentioned pigments include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

In the case where the ink P12 contains a pigment, the average particle diameter of the pigment is preferably 300 nm or less, more preferably 50 nm or more and 250 nm or less. According to this, the ejection stability of the ink P12 and the dispersion stability of the pigment in the ink P12 can be made particularly excellent, and also an image with a higher image quality can be formed.

Examples of the dye include acidic dyes, direct dyes, reactive dyes, and basic dyes, and one dye or a combination of two or more dyes selected from these can be used.

Specific examples of the dye include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79 and 249, and C.I. Reactive Black 3, 4, and 35.

In the case where the ink P12 contains the coloring agent, the content of the coloring agent in the ink P12 is preferably 1% by mass or more and 20% by mass or less. According to this, particularly excellent concealing property and color reproducibility are obtained.

In particular, in the case where the ink P12 contains titanium oxide as the coloring agent, the content of titanium oxide in the ink P12 is preferably 1% by mass or more and 18% by mass or less, more preferably 2% by mass or more and 16% by mass or less with respect to the total content of solid components contained in the ink P12 (all the components to be contained in the cellulosic member P10). According to this, a particularly excellent concealing property is obtained.

Examples of the fluorescent material constituting the ink P12 include C.I. Direct Yellow 87, C.I. Acid Red 52, C.I. Acid Red 92, Brilliant Sulfo Flavin, Eosin, Basic Flavin, Acridine Orange, Rhodamine 6G, and Rhodamine B.

Examples of the light storage material constituting the ink P12 include sulfides of alkaline earths such as zinc, calcium, strontium, and barium and light storage materials such as strontium aluminate, or inorganic fluorescent materials such as various sulfides and oxides exemplified as zinc sulfide.

Examples of the phosphorescent material constituting the ink P12 include an iridium complex and a cyclometallated complex.

Examples of the infrared absorbing material constituting the ink P12 include ITO and ATO fine particles.

In the case where the ink P12 contains a dispersoid such as a pigment, if the ink P12 further contains a dispersant, the dispersibility of the dispersoid can be made more favorable.

The dispersant is not particularly limited, but examples thereof include dispersants which are commonly used for preparing a pigment dispersion liquid such as a polymeric dispersant.

Specific examples of the polymeric dispersant include dispersants containing, as a main component, at least one of polyoxyalkylene polyalkylene polyamine, a vinyl-based polymer or copolymer, an acrylic polymer or copolymer, polyester, polyamide, polyimide, polyurethane, an amino-based polymer, a silicon-containing polymer, a sulfur-containing polymer, a fluorine-containing polymer, and an epoxy resin.

Examples of a commercially available product of the polymeric dispersant include AJISPER series manufactured by Ajinomoto Fine-Techno Co., Inc., Solsperse series (Solsperse 36000, etc.) available from Noveon, Inc., DISPER-BYK series manufactured by BYK, Inc., and DISPARLON series manufactured by Kusumoto Chemicals, Ltd.

When the ink P12 contains a surfactant, the abrasion resistance of the cellulosic member P10 can be made more favorable.

The surfactant is not particularly limited, however, for example, a polyester-modified silicone, a polyether-modified silicone, or the like as a silicone-based surfactant can be used, and in particular, it is preferred to use polyether-modified polydimethylsiloxane or polyester-modified polydimethylsiloxane.

Specific examples of the surfactant include BYK-347, BYK-348, BYK-UV3500, BYK-UV 3510, BYK-UV 3530, and BYK-UV3570 (all are trade names of products manufactured by BYK, Inc.).

The viscosity of the ink P12 is preferably 10 mPa·s or more and 30 mPa·s or less, more preferably 15 mPa·s or more and 25 mPa·s or less. According to this, the ejection stability of the ink P12 by an inkjet method can be made particularly excellent.

Composition P1' (Particle Body-Containing Composition)

Hereinafter, the composition P1' to be used in the production method of the first embodiment mentioned above will be described in detail.

The composition P1' contains at least a three-dimensional shaping powder containing multiple particle bodies.

Three-Dimensional Shaping Powder (Particle Bodies)

Examples of a constituent material of the particles bodies constituting the three-dimensional shaping powder include an inorganic material, an organic material, and a composite of these materials.

Examples of the inorganic material constituting the particles bodies include various metals and metal compounds. Examples of the metal compounds include various metal oxides such as silica, alumina, titanium oxide, zinc oxide, zirconium oxide, tin oxide, magnesium oxide, and potassium titanate; various metal hydroxides such as magnesium hydroxide, aluminum hydroxide, and calcium hydroxide; various metal nitrides such as silicon nitride, titanium nitride, and aluminum nitride; various metal carbides such as silicon carbide and titanium carbide; various metal sulfides such as zinc sulfide; carbonates of various metals such as calcium carbonate and magnesium carbonate; sulfates of various metals such as calcium sulfate and magnesium sulfate; silicates of various metals such as calcium silicate and magnesium silicate; phosphates of various metals such as calcium phosphate; borates of various metals such as aluminum borate and magnesium borate; and composites of these materials.

Examples of the organic material constituting the particle bodies include synthetic resins and natural polymers, and more specific examples thereof include a polyethylene resin; polypropylene; polyethylene oxide; polypropylene oxide; polyethylenimine; polystyrene; polyurethane; polyuria; polyester; a silicone resin; an acrylic silicone resin; a polymer containing a (meth)acrylate ester as a constituent monomer such as poly(methyl methacrylate); a crosspolymer (an ethylene acrylic acid copolymer resin or the like) containing a (meth)acrylate ester as a constituent monomer such as a methyl methacrylate crosspolymer; polyamide resins such as nylon 12, nylon 6, and copolymer nylon; polyimide; gelatin; starch; chitin; and chitosan.

The particle bodies constituting the three-dimensional shaping powder may be subjected to a surface treatment such as a hydrophobization treatment or a hydrophilization treatment.

The average particle diameter of the particle bodies constituting the three-dimensional shaping powder is not particularly limited, but is preferably 1 μm or more and 25 μm or less, more preferably 1 μm or more and 15 μm or less. According to this, the mechanical strength of the cellulosic member P10 can be made particularly excellent, and also the occurrence of undesirable irregularities or the like in the cellulosic member P10 to be produced is more effectively prevented, and the dimensional accuracy of the cellulosic member P10 can be made particularly excellent. Further, the fluidity of the three-dimensional shaping powder and the fluidity of the three-dimensional shaping powder-containing composition (three-dimensional shaping composition) P1' can be made particularly excellent, and thus, the productivity of the cellulosic member P10 can be made particularly excellent.

The Dmax of the particle bodies constituting the three-dimensional shaping powder is preferably 3 μm or more and 40 μm or less, more preferably 5 μm or more and 30 μm or less. According to this, the mechanical strength of the cellulosic member P10 can be made particularly excellent, and also the occurrence of undesirable irregularities or the like in the cellulosic member P10 to be produced is more effectively prevented, and the dimensional accuracy of the cellulosic member P10 can be made particularly excellent. Further, the fluidity of the three-dimensional shaping powder and the fluidity of the three-dimensional shaping powder-containing composition (three-dimensional shaping composition) P1' can be made particularly excellent, and thus, the productivity of the cellulosic member P10 can be made particularly excellent.

The particle bodies constituting the three-dimensional shaping powder may have any shape, but preferably have a spherical shape. According to this, the fluidity of the three-dimensional shaping powder and the fluidity of the three-dimensional shaping powder-containing composition (three-dimensional shaping composition) P1' can be made particularly excellent, and thus, the productivity of the cellulosic member P10 can be made particularly excellent, and also the occurrence of undesirable irregularities or the like in the cellulosic member P10 to be produced is more effectively prevented, and the dimensional accuracy of the cellulosic member P10 can be made particularly excellent.

The content of the three-dimensional shaping powder in the composition (three-dimensional shaping composition) P1' is preferably 10% by mass or more and 95% by mass or less, more preferably 15% by mass or more and 75% by mass or less. According to this, while making the fluidity of the composition (three-dimensional shaping composition) P1' sufficiently high, the mechanical strength of the finally obtained cellulosic member P10 can be made particularly excellent.

Water-Soluble Resin

The composition P1' may contain a water-soluble resin along with the multiple particle bodies.

By including the water-soluble resin, the particle bodies are bonded (temporarily fixed) to one another in a region of the layer P1 where the ink P12 is not applied, and thus, undesirable scattering or the like of the particle bodies can be more effectively prevented. According to this, the safety for workers and the dimensional accuracy of the cellulosic member P10 to be produced can be further improved.

The water-soluble resin may be any as long as it is at least partially soluble in water, but is preferably, for example, a resin having a solubility in water at 25° C. (a mass soluble in 100 g of water) of 5 [g/100 g of water] or more, more preferably a resin having a solubility in water at 25° C. of 10 [g/100 g of water] or more.

Examples of the water-soluble resin include synthetic polymers such as polyvinyl alcohol (PVA), polyvinylpyrrolidone (PVP), polycaprolactone diol, sodium polyacrylate, polyacrylamide, modified polyamide, polyethylenimine, polyethylene oxide, and a random copolymer of ethylene oxide and propylene oxide; natural polymers such as corn starch, mannan, pectin, agar, alginic acid, dextran, glue, and gelatin; and semisynthetic polymers such as starch, oxidized starch, and modified starch, and one material or a combination of two or more materials selected from these can be used.

Examples of a water-soluble resin product include sodium starch phosphate ester (I) (Hosuta 5100, manufactured by Matsutani Chemical Industry Co., Ltd.), polyvinylpyrrolidone (PVP K-90, manufactured by Tokyo Chemical Industry Co., Ltd.), a copolymer of methyl vinyl ether/maleic anhydride (Gantrez AN-139, manufactured by GAF Corporation), polyacrylamide (manufactured by Wako Pure Chemical Industries, Ltd.), modified polyamide (modified nylon) (AQ nylon, manufactured by Toray Industries, Inc.), polyethylene oxide (PEO-1, manufactured by Seitetsu Kagaku Co., Ltd., Alkox, manufactured by Meisei Chemical Works, Ltd.), a random copolymer of ethylene oxide and propylene oxide (Alkox EP, manufactured by Meisei Chemical Works, Ltd.), sodium polyacrylate (manufactured by Wako Pure Chemical Industries, Ltd.), and a carboxyvinyl polymer/cross-linked acrylic water-soluble resin (Aqupec, manufactured by Sumitomo Seika Chemicals Co., Ltd.).

In particular, in the case where the water-soluble resin is polyvinyl alcohol, the mechanical strength of the cellulosic member P10 can be made particularly excellent. Further, by adjusting the degree of saponification or the degree of polymerization, the properties (for example, water solubility, water resistance, etc.) of the water-soluble resin and the properties (for example, viscosity, fixing force of particle bodies, wettability, etc.) of the composition P1' can be more favorably controlled. Due to this, polyvinyl alcohol can be more favorably applied to the production of a variety of cellulosic members P10. Further, polyvinyl alcohol is inexpensive and offers a stable supply among the various water-soluble resins. Due to this, while keeping the production cost low, the cellulosic member P10 can be stably produced.

In the case where the water-soluble resin contains polyvinyl alcohol, the degree of saponification of the polyvinyl alcohol is preferably 85 or more and 90 or less. According to this, a decrease in the solubility of polyvinyl alcohol in water can be prevented. Due to this, in the case where the composition P1' contains water, a decrease in the adhesiveness between adjacent layers P1 can be more effectively prevented.

In the case where the water-soluble resin contains polyvinyl alcohol, the degree of polymerization of the polyvinyl alcohol is preferably 300 or more and 1,000 or less. According to this, in the case where the composition P1' contains water, the mechanical strength of the respective layers P1 and the adhesiveness between adjacent layers P1 can be made particularly excellent.

Further, in the case where the water-soluble resin is polyvinylpyrrolidone (PVP), effects as described below are obtained. That is, polyvinylpyrrolidone has excellent adhesiveness to various materials such as a glass, a metal, and a plastic, and therefore, the strength, the stability of the shape of a region of the layer P1 to which the ink P12 is not applied can be made particularly excellent, and the dimensional accuracy of the finally obtained cellulosic member P10 can be made particularly excellent. Further, polyvinylpyrrolidone shows high solubility in water, and therefore, in an unbonded particle removal step (after completion of shaping), among the particle bodies constituting the respective layers P1, particle bodies which are not bonded to one another by the cellulose derivative can be easily and reliably removed. Further, polyvinylpyrrolidone has moderate affinity for the three-dimensional shaping powder as mentioned above, and therefore has relatively high wettability to the surfaces of the particle bodies. Due to this, the function to temporarily fix the particle bodies as mentioned above can be more effectively exhibited. Further, polyvinylpyrrolidone has excellent affinity for various coloring agents, and therefore, in the case where the ink P12 containing a coloring agent is used in the ink application step, undesirable diffusion of the coloring agent can be effectively prevented. Further, in the case where the composition P1' in the form of a paste contains polyvinylpyrrolidone, the inclusion of bubbles in the composition P1' can be effectively prevented, and in the layer forming step, the occurrence of defects due to the inclusion of bubbles can be more effectively prevented.

In the case where the water-soluble resin contains polyvinylpyrrolidone, the weight average molecular weight of the polyvinylpyrrolidone is preferably 10,000 or more 1,700,000 or less, more preferably 30,000 or more 1,500,000 or less. According to this, the above-mentioned function can be more effectively exhibited.

Further, in the case where the water-soluble resin is polycaprolactone diol, the composition P1' can be favorably formed into pellets, and undesirable scattering or the like of the particle bodies can be more effectively prevented, and the handleability (ease of handling) of the composition P1' is improved, so that the safety for workers and the dimensional accuracy of the cellulosic member P10 to be produced can be improved. Further, melting can be achieved at a relatively low temperature, and thus, the energy and cost required for the production of the cellulosic member P10 can be kept low, and also the productivity of the cellulosic member P10 can be made sufficiently high.

In the case where the water-soluble resin contains polycaprolactone diol, the weight average molecular weight of the polycaprolactone diol is preferably 10,000 or more 1,700,000 or less, more preferably 30,000 or more 1,500,000 or less. According to this, the above-mentioned function can be more effectively exhibited.

In the composition P1', the water-soluble resin is preferably in a liquid state (for example, in a dissolved state, in a molten state, or the like) in at least the layer forming step. According to this, the uniformity of the thickness of the layer P1 to be formed using the composition P1' can be easily and reliably increased.

Solvent

The composition P1' may contain a volatile solvent in addition to the components as mentioned above.

According to this, the composition P1' can be favorably formed into a paste, and the fluidity of the composition P1' can be stably made excellent, and the productivity of the cellulosic member P10 can be made particularly excellent.

The solvent is preferably a solvent which dissolves the water-soluble resin. According to this, the fluidity of the composition P1' can be made favorable, and an undesirable variation in the thickness of the layer P1 to be formed using the composition P1' can be more effectively prevented. Further, when the layer P1 in a state where the solvent is removed is formed, the water-soluble resin can be more highly uniformly adhered to the particle bodies throughout the entire layer P1, and thus, the occurrence of undesirable unevenness of the composition can be more effectively prevented. Due to this, the occurrence of an undesirable variation in the mechanical strength among individual regions of the finally obtained cellulosic member P10 can be more effectively prevented, and thus, the reliability of the cellulosic member P10 can be made higher.

Examples of the solvent constituting the composition P1' include water; alcoholic solvents such as methanol, ethanol, and isopropanol; ketone-based solvents such as methyl ethyl ketone and acetone; glycol ether-based solvents such as ethylene glycol monoethyl ether and ethylene glycol monobutyl ether; glycol ether acetate-based solvents such as propylene glycol 1-monomethyl ether 2-acetate and propylene glycol 1-monoethyl ether 2-acetate; polyethylene glycol, and polypropylene glycol, and one solvent or a combination of two or more solvents selected from these can be used.

In particular, the composition P1' preferably contains water. According to this, the water-soluble resin can be more reliably dissolved, and the fluidity of the composition P1' and the uniformity of the composition of the layer P1 to be formed using the composition P1' can be made particularly excellent. Further, water is easily removed after forming the layer P1, and also even if water remains in the cellulosic member P10, water has few adverse effects. In addition, water is advantageous also from the viewpoint of safety for human beings, environmental problems, and the like.

In the case where the composition P1' contains a solvent, the content of the solvent in the composition P1' is preferably 5% by mass or more and 75% by mass or less, more preferably 25% by mass or more and 70% by mass or less. According to this, the effect of including the solvent as mentioned above is more remarkably exhibited, and also the solvent can be easily removed in a short time in the production process for the cellulosic member P10, and thus, it is advantageous from the viewpoint of improvement of the productivity of the cellulosic member P10.

In particular, in the case where the composition P1' contains water as the solvent, the content of water in the composition P1' is preferably 20% by mass or more and 73% by mass or less, more preferably 50% by mass or more and 70% by mass or less. According to this, the effect as mentioned above is more remarkably exhibited.

In the case where the composition P1' contains a solvent, the solvent is preferably removed from the composition P1' constituting the layer P1 before the ink P12 is applied. According to this, the stability of the shape of the layer P1 is improved, and also even if the solvent has low affinity for the constituent material (for example, the cellulose derivative, water, or the like) of the ink P12, undesirable repelling of the ink P12 from the layer P1 or the like can be effectively prevented, and thus, the ink P12 can be easily and reliably applied to the layer P1 in a desired pattern.

In the case where the solvent constituting the composition P1' is removed from the composition P1' constituting the layer P1 before the ink P12 is applied, the solvent may be completely removed from the layer P1, or may be partially removed from the layer P1. Even in such a case, the effect as mentioned above is exhibited.

Another Component

The composition P1' may contain a component other than the above-mentioned components. Examples of such a component include a polymerization initiator, a polymerization accelerator, a crosslinking agent, a siloxane compound, a reducing agent, a permeation accelerator, a wetting agent (a humectant), a fixing agent, an antifungal agent, a preservative, an antioxidant, a UV absorbing agent, a chelating agent, and a pH adjusting agent.

Second Embodiment

In the production method of the second embodiment, as the materials for producing the cellulosic member, the ink P12 and the composition P1' are used.

Ink P12

Hereinafter, the ink P12 to be used in the production method of the second embodiment mentioned above will be described in detail.

The ink P12 contains a binding agent (bonding agent).

Binding Agent

Examples of the binding agent (bonding agent) include a thermoplastic resin; a thermosetting resin; various photocurable resins such as a visible light curable resin which is cured by a light in the visible light range (a photocurable resin in a narrow sense), a UV curable resin, and an IR curable resin; and an X-ray curable resin, and one binding agent or a combination of two or more binding agents selected from these can be used. Above all, from the viewpoint of the mechanical strength of the cellulosic member P10 to be obtained, the productivity of the cellulosic member P10, and the like, the binding agent is preferably a binding agent containing a curable resin. Further, among the various curable resins, from the viewpoint of the mechanical strength of the cellulosic member P10 to be obtained, the productivity of the cellulosic member P10, the storage stability of the binding agent, and the like, particularly, a UV curable resin (a polymerizable compound) is preferred.

As the UV curable resin (polymerizable compound), a compound whose addition polymerization or ring-opening polymerization is initiated by a radical species, a cationic species, or the like generated from a photopolymerization initiator by UV irradiation, thereby forming a polymer is preferably used. Examples of the polymerization form of the addition polymerization include radical, cationic, anionic, metathesis, and coordination polymerization. Further, examples of the polymerization form of the ring-opening polymerization include cationic, anionic, radical, metathesis, and coordination polymerization.

Examples of the addition polymerizable compound include compounds having at least one ethylenically unsaturated double bond. As the addition polymerizable compound, a compound having at least one, preferably two or more terminal ethylenically unsaturated bonds can be preferably used.

An ethylenically unsaturated polymerizable compound has a chemical form of a monofunctional polymerizable compound, a polyfunctional polymerizable compound, or a mixture of these compounds. Examples of the monofunctional polymerizable compound include unsaturated carboxylic acids (for example, acrylic acid, methacrylic acid, itaconic acid, crotonic acid, isocrotonic acid, maleic acid, etc.) and esters thereof, and amides thereof. As the polyfunctional polymerizable compound, an ester of an unsaturated carboxylic acid with an aliphatic polyhydric alcohol compound or an amide of an unsaturated carboxylic acid with an aliphatic polyvalent amine compound is used.

Further, an addition reaction product of an ester or an amide of an unsaturated carboxylic acid having a hydroxyl group or a nucleophilic substituent such as an amino group or a mercapto group with an isocyanate or an epoxy, a dehydration condensation reaction product with a carboxylic acid, or the like can also be used. Further, an addition reaction product of an ester or an amide of an unsaturated carboxylic acid having an electrophilic substituent such as an isocyanate group or an epoxy group with an alcohol, an amine, or a thiol, further, a substitution reaction product of an ester or an amide of an unsaturated carboxylic acid having a leaving substituent such as a halogen group or a tosyloxy group with an alcohol, an amine, or a thiol can also be used.

For example, a (meth)acrylate ester is representative of a specific example of the radical polymerizable compound which is the ester of an unsaturated carboxylic acid with an aliphatic polyhydric alcohol compound, and either of a monofunctional (meth)acrylate and a polyfunctional (meth)acrylate can be used.

Specific examples of the monofunctional (meth)acrylate include tolyloxyethyl (meth)acrylate, phenyloxyethyl (meth)acrylate, cyclohexyl (meth)acrylate, ethyl (meth)

acrylate, methyl (meth)acrylate, isobornyl (meth)acrylate, and tetrahydrofurfuryl (meth)acrylate.

Specific examples of a difunctional (meth)acrylate include ethylene glycol di(meth)acrylate, triethylene glycol di(meth)acrylate, 1,3-butanediol di(meth)acrylate, tetramethylene glycol di(meth)acrylate, propylene glycol di(meth)acrylate, neopentyl glycol di(meth)acrylate, hexanediol di(meth)acrylate, 1,4-cyclohexanediol di(meth)acrylate, tetraethylene glycol di(meth)acrylate, pentaerythritol di(meth)acrylate, and dipentaerythritol di(meth)acrylate.

Specific examples of a trifunctional (meth)acrylate include trimethylolpropane tri(meth)acrylate, trimethylolethane tri(meth)acrylate, alkylene oxide-modified tri(meth)acrylate of trimethylolpropane, pentaerythritol tri(meth)acrylate, dipentaerythritol tri(meth)acrylate, trimethylolpropane tri((meth)acryloyloxypropyl) ether, isocyanuric acid alkylene oxide-modified tri(meth)acrylate, propionic acid dipentaerythritol tri(meth)acrylate, tri((meth)acryloyloxyethyl) isocyanurate, hydroxypivalaldehyde-modified dimethylolpropane tri(meth)acrylate, and sorbitol tri(meth)acrylate.

Specific examples of a tetrafunctional (meth)acrylate include pentaerythritol tetra(meth)acrylate, sorbitol tetra(meth)acrylate, ditrimethylolpropane tetra(meth)acrylate, propionic acid dipentaerythritol tetra(meth)acrylate, and ethoxylated pentaerythritol tetra(meth)acrylate.

Specific examples of a pentafunctional (meth)acrylate include sorbitol penta(meth)acrylate and dipentaerythritol penta(meth)acrylate.

Specific examples of a hexafunctional (meth)acrylate include dipentaerythritol hexa(meth)acrylate, sorbitol hexa(meth)acrylate, alkylene oxide-modified hexa(meth)acrylate of phosphazene, and caprolactone-modified dipentaerythritol hexa(meth)acrylate.

Examples of the polymerizable compound other than (meth)acrylates include itaconate esters, crotonate esters, isocrotonate esters, and maleate esters.

Examples of the itaconate esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of the crotonate esters include ethylene glycol dicrotonate, tetramethylene glycol dicrotonate, pentaerythritol dicrotonate, and sorbitol tetradicrotonate.

Examples of the isocrotonate esters include ethylene glycol diisocrotonate, pentaerythritol diisocrotonate, and sorbitol tetraisocrotonate.

Examples of the maleate esters include ethylene glycol dimaleate, triethylene glycol dimaleate, pentaerythritol dimaleate, and sorbitol tetramaleate.

As an example of another ester, for example, an aliphatic alcohol ester, an ester having an aromatic backbone, an ester containing an amino group, or the like can also be used.

Specific examples of a monomer of the amide of an unsaturated carboxylic acid with an aliphatic polyvalent amine compound include methylenebis-acrylamide, methylenebis-methacrylamide, 1,6-hexamethylenebis-acrylamide, 1,6-hexamethylenebis-methacrylamide, diethylenetriamine trisacrylamide, xylylene bisacrylamide, and xylylene bismethacrylamide.

Other preferred examples of an amide-based monomer include monomers having a cyclohexylene structure.

A urethane-based addition polymerizable compound produced by an addition reaction between an isocyanate and a hydroxy group is also preferred, and specific examples of such a compound include vinyl urethane compounds containing two or more polymerizable vinyl groups in one molecule obtained by adding a vinyl monomer containing a hydroxy group represented by the following formula (1) to a polyisocyanate compound having two or more isocyanate groups in one molecule.

$$CH_2=C(R^1)COOCH_2CH(R^2)OH \qquad (1)$$

In the formula (1), $R^1$ and $R^2$ each independently represent H or $CH_3$.

In the invention, a cationic ring-opening polymerizable compound having at least one cyclic ether group such as an epoxy group or an oxetane group in the molecule can be favorably used as a UV curable resin (a polymerizable compound).

Examples of the cationic polymerizable compound include curable compounds containing a ring-opening polymerizable group, and among these, heterocyclic group-containing curable compounds are particularly preferred. Examples of such curable compounds include cyclic imino ethers such as epoxy derivatives, oxetane derivatives, tetrahydrofuran derivatives, cyclic lactone derivatives, cyclic carbonate derivatives, and oxazoline derivatives, and vinyl ethers, and among these, epoxy derivatives, oxetane derivatives, and vinyl ethers are preferred.

Preferred examples of the epoxy derivatives include monofunctional glycidyl ethers, polyfunctional glycidyl ethers, monofunctional alicyclic epoxies, and polyfunctional alicyclic epoxies.

Specific examples of compounds of the glycidyl ethers include diglycidyl ethers, (for example, ethylene glycol diglycidyl ether, bisphenol A diglycidyl ether, etc.), trifunctional or higher functional glycidyl ethers (for example, trimethylolethane triglycidyl ether, trimethylolpropane triglycidyl ether, glycerol triglycidyl ether, triglycidyl trishydroxyethyl isocyanurate, etc.), tetrafunctional or higher functional glycidyl ethers (for example, sorbitol tetraglycidyl ether, pentaerythritol tetraglycyl ether, polyglycidyl ethers of cresol novolac resins, polyglycidyl ethers of phenolnovolac resins, etc.), alicyclic epoxies (for example, Celloxide 2021P, Celloxide 2081, Epolead GT-301, and Epolead GT-401 (all are manufactured by Daicel Chemical Industries, Ltd.)), EHPE (manufactured by Daicel Chemical Industries, Ltd.), polycyclohexyl epoxy methyl ethers of phenol novolac resins, etc.), and oxetanes (for example, OX-SQ and PNOX-1009 (all are manufactured by Toagosei Co., Ltd.), etc.).

As the polymerizable compound, an alicyclic epoxy derivative can be preferably used. An "alicyclic epoxy group" refers to a partial structure in which a double bond of a cycloalkene ring of a cyclopentene group, a cyclohexene group, or the like is epoxidized with a suitable oxidizing agent such as hydrogen peroxide or a peroxy acid.

As the alicyclic epoxy compound, a polyfunctional alicyclic epoxy compound having two or more cyclohexene oxide groups or cyclopentene oxide groups in one molecule is preferred. Specific examples of the alicyclic epoxy compound include 4-vinylcyclohexene dioxide, (3,4-epoxycyclohexyl)methyl-3,4-epoxycyclohexylcarboxylate, di(3,4-epoxycyclohexyl) adipate, di(3,4-epoxycyclohexylmethyl) adipate, bis(2,3-epoxycyclopentyl) ether, di(2,3-epoxy-6-methylcyclohexylmethyl) adipate, and dicyclopentadiene dioxide.

A normal glycidyl compound having an epoxy group but having no alicyclic structure in the molecule can be used alone or can also be used in combination with the above-mentioned alicyclic epoxy compound.

Examples of such a normal glycidyl compound include a glycidyl ether compound and a glycidyl ester compound, but it is preferred to use a glycidyl ether compound in combination.

Specific examples of the glycidyl ether compound include aromatic glycidyl ether compounds such as 1,3-bis(2,3-epoxypropyloxy)benzene, a bisphenol A type epoxy resin, a bisphenol F type epoxy resin, a phenol novolac type epoxy resin, a cresol novolac type epoxy resin, and a trisphenol methane type epoxy resin; and aliphatic glycidyl ether compounds such as 1,4-butanediol glycidyl ether, glycerol triglycidyl ether, propylene glycol diglycidyl ether, and trimethylolpropane tritriglycidyl ether. Examples of the glycidyl ester include glycidyl esters of linoleic acid dimers.

As the polymerizable compound, a compound having an oxetanyl group, which is a four-membered cyclic ether (hereinafter also simply referred to as "oxetane compound") can be used. The oxetanyl group-containing compound is a compound having one or more oxetanyl groups in one molecule.

The content of the binding agent in the ink P12 is preferably 80% by mass or more, more preferably 85% by mass or more. According to this, the mechanical strength of the finally obtained cellulosic member P10 can be made particularly excellent.

Another Component

The ink P12 may contain a component (another component) other than the above-mentioned components. Examples of such a component include various coloring agents such as a pigment and a dye, various fluorescent materials, various light storage materials, various phosphorescent materials, an infrared absorbing material, a dispersant, a surfactant, a polymerization initiator, a polymerization accelerator, a solvent, a crosslinking agent, a permeation accelerator, a wetting agent (a humectant), a fixing agent, an antifungal agent, a preservative, an antioxidant, a siloxane compound, a reducing agent, a UV absorbing agent, a chelating agent, a pH adjusting agent, a thickening agent, a filler, an anti-aggregation agent, a defoaming agent, and a cellulose derivative.

In particular, by including a coloring agent in the ink P12, the cellulosic member P10 colored in a color corresponding to the color of the coloring agent can be obtained.

In particular, by including a pigment as the coloring agent, the light resistance of the ink P12 and the cellulosic member P10 can be made favorable. As the pigment, either of an inorganic pigment and an organic pigment can be used.

Examples of the inorganic pigment include carbon blacks (C.I. Pigment Black 7) such as Furnace Black, Lamp Black, Acetylene Black, and Channel Black, iron oxide, and titanium oxide, and one pigment or a combination of two or more pigments selected from these can be used.

Among the inorganic pigments, in order to take on a preferred white color, titanium oxide is preferred.

Examples of the organic pigment include azo pigments such as insoluble azo pigments, condensed azo pigments, azo lakes, and chelate azo pigments, polycyclic pigments such as phthalocyanine pigments, perylene and perinone pigments, anthraquinone pigments, quinacridone pigments, dioxane pigments, thioindigo pigments, isoindolinone pigments, and quinophthalone pigments, dye chelates (for example, basic dye type chelates, acidic dye type chelates, etc.), dye lakes (basic dye type lakes and acidic dye type lakes), nitro pigments, nitroso pigments, and aniline black, and one pigment or a combination of two or more pigments selected from these can be used.

More specifically, examples of the carbon black to be used as a black pigment include No. 2300, No. 900, MCF88, No. 33, No. 40, No. 45, No. 52, MA7, MA8, MA100, No. 2200B, etc. (all are manufactured by Mitsubishi Chemical Corporation), Raven 5750, Raven 5250, Raven 5000, Raven 3500, Raven 1255, Raven 700, etc. (all are manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, etc. (all are manufactured by CABOT JAPAN K.K.), and Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, Special Black 4, etc. (all are manufactured by Degussa GmbH).

Examples of a white pigment include C.I. Pigment White 6, 18, and 21.

Examples of a yellow pigment include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of a magenta pigment include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violet 19, 23, 32, 33, 36, 38, 43, and 50.

Examples of a cyan pigment include C.I. Pigment Blue 1, 2, 3, 15, 15:1, 15:2, 15:3, 15:34, 15:4, 16, 18, 22, 25, 60, 65, and 66 and C.I. Vat Blue 4 and 60.

Examples of a pigment other than the above-mentioned pigments include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

In the case where the ink P12 contains a pigment, the average particle diameter of the pigment is preferably 300 nm or less, more preferably 50 nm or more and 250 nm or less. According to this, the ejection stability of the ink P12 and the dispersion stability of the pigment in the ink P12 can be made particularly excellent, and also an image with a higher image quality can be formed.

Examples of the dye include acidic dyes, direct dyes, reactive dyes, and basic dyes, and one dye or a combination of two or more dyes selected from these can be used.

Specific examples of the dye include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79 and 249, and C.I. Reactive Black 3, 4, and 35.

In the case where the ink P12 contains the coloring agent, the content of the coloring agent in the ink P12 is preferably 1% by mass or more and 20% by mass or less. According to this, particularly excellent concealing property and color reproducibility are obtained.

In particular, in the case where the ink P12 contains titanium oxide as the coloring agent, the content of titanium oxide in the ink P12 is preferably 1% by mass or more and 18% by mass or less, more preferably 2% by mass or more and 16% by mass or less with respect to the total content of solid components contained in the ink P12 (all the components to be contained in the cellulosic member P10). According to this, a particularly excellent concealing property is obtained.

Examples of the fluorescent material constituting the ink P12 include C.I. Direct Yellow 87, C.I. Acid Red 52, C.I. Acid Red 92, Brilliant Sulfo Flavin, Eosin, Basic Flavin, Acridine Orange, Rhodamine 6G, and Rhodamine B.

Examples of the light storage material constituting the ink P12 include sulfides of alkaline earth metals such as zinc, calcium, strontium, and barium and light storage materials such as strontium aluminate, or inorganic fluorescent materials such as various sulfides and oxides exemplified as zinc sulfide.

Examples of the phosphorescent material constituting the ink P12 include an iridium complex and a cyclometallated complex.

Examples of the infrared absorbing material constituting the ink P12 include ITO and ATO fine particles.

In the case where the ink P12 contains a dispersoid such as a pigment, if the ink P12 further contains a dispersant, the dispersibility of the dispersoid can be made more favorable.

The dispersant is not particularly limited, but examples thereof include dispersants which are commonly used for preparing a pigment dispersion liquid such as a polymeric dispersant.

Specific examples of the polymeric dispersant include dispersants containing, as a main component, at least one of polyoxyalkylene polyalkylene polyamine, a vinyl-based polymer or copolymer, an acrylic polymer or copolymer, polyester, polyamide, polyimide, polyurethane, an amino-based polymer, a silicon-containing polymer, a sulfur-containing polymer, a fluorine-containing polymer, and an epoxy resin.

Examples of a commercially available product of the polymeric dispersant include AJISPER series manufactured by Ajinomoto Fine-Techno Co., Inc., Solsperse series (Solsperse 36000, etc.) available from Noveon, Inc., DISPER-BYK series manufactured by BYK, Inc., and DISPARLON series manufactured by Kusumoto Chemicals, Ltd.

When the ink P12 contains a surfactant, the abrasion resistance of the cellulosic member P10 can be made more favorable.

The surfactant is not particularly limited, however, for example, a polyester-modified silicone, a polyether-modified silicone, or the like as a silicone-based surfactant can be used, and in particular, it is preferred to use polyether-modified polydimethylsiloxane or polyester-modified polydimethylsiloxane.

Specific examples of the surfactant include BYK-347, BYK-348, BYK-UV3500, BYK-UV 3510, BYK-UV 3530, and BYK-UV3570 (all are trade names of products manufactured by BYK, Inc.).

The viscosity of the ink P12 is preferably 10 mPa·s or more and 30 mPa·s or less, more preferably 15 mPa·s or more and 25 mPa·s or less. According to this, the ejection stability of the ink P12 by an inkjet method can be made particularly excellent.

Composition P1' (Composition Containing Cellulose Derivative)

Hereinafter, the composition P1' to be used in the production method of the second embodiment mentioned above will be described in detail.

The composition P1' contains the cellulosic material (cellulosic composition) according to the invention, and contains a cellulose derivative having an oxidizable/reducible functional group introduced thereinto.

In particular, in this embodiment, the composition P1' contains at least water and a cellulose derivative having an oxidizable/reducible functional group in an oxidized state introduced thereinto.

According to this, the composition P1' has excellent handleability, and thus, the workability (such as coatability) when the layer P1 is formed using the composition P1' becomes excellent. Further, the cellulosic member P10 to be produced sufficiently exhibits the advantageous characteristics intrinsically possessed by cellulose (for example, high strength, light weight, biosafety, environmental safety, etc.), and thus has excellent mechanical strength, durability, reliability, and the like.

Cellulose Derivative

The cellulose derivative contained in the composition P1' preferably satisfies the conditions as mentioned above.

The form of the cellulose derivative in the composition P1' is not particularly limited, and for example, the cellulose derivative may be dissolved in water or may be in a state of being dispersed in a solvent (a dispersion medium) containing water.

In the case where the cellulose derivative is contained in the form of particle bodies (as an insoluble component), the average particle diameter of the cellulose derivative is not particularly limited, but is preferably 1 μm or more and 25 μm or less, more preferably 1 μm or more and 15 μm or less. According to this, the mechanical strength of the cellulosic member P10 can be made particularly excellent, and also the occurrence of undesirable irregularities or the like in the cellulosic member P10 to be produced is more effectively prevented, and the dimensional accuracy of the cellulosic member P10 can be made particularly excellent. Further, the fluidity of the composition (three-dimensional shaping composition) P1' can be made particularly excellent, and thus, the productivity of the cellulosic member P10 can be made particularly excellent.

In the case where the cellulose derivative is contained in the form of particle bodies (as an insoluble component), the Dmax of the cellulose derivative is preferably 3 μm or more and 40 μm or less, more preferably 5 μm or more and 30 μm or less. According to this, the mechanical strength of the cellulosic member P10 can be made particularly excellent, and also the occurrence of undesirable irregularities or the like in the cellulosic member P10 to be produced is more effectively prevented, and the dimensional accuracy of the cellulosic member P10 can be made particularly excellent. Further, the fluidity of the composition (three-dimensional shaping composition) P1' can be made particularly excellent, and thus, the productivity of the cellulosic member P10 can be made particularly excellent.

In the case where the cellulose derivative is contained in the form of particle bodies (as an insoluble component), the cellulose derivative may have any shape, but preferably has a spherical shape. According to this, the fluidity of the composition (three-dimensional shaping composition) P1' can be made particularly excellent, and thus, the productivity of the cellulosic member P10 can be made particularly excellent, and also the occurrence of undesirable irregularities or the like in the cellulosic member P10 to be produced is more effectively prevented, and the dimensional accuracy of the cellulosic member P10 can be made particularly excellent.

The content of the cellulose derivative in the composition P1' is not particularly limited, but is preferably 10% by mass or more and 95% by mass or less, more preferably 15% by mass or more and 75% by mass or less. According to this, while making the fluidity of the composition (three-dimensional shaping composition) P1' sufficiently high, the mechanical strength of the finally obtained cellulosic member P10 can be made particularly excellent.

Water

The composition P1' contains water in addition to the cellulose derivative as mentioned above.

According to this, the fluidity of the composition P1' can be made excellent, and thus, the productivity of the cellulosic member P10 can be made excellent.

The content of water in the composition P1' is not particularly limited, but is preferably 1% by mass or more and 50% by mass or less, more preferably 2% by mass or more and 40% by mass or less.

According to this, while making the fluidity and handleability of the composition P1' more excellent, water can be removed more rapidly from the composition P1', and therefore, the productivity of the cellulosic member P10 can be made particularly excellent.

Water-Soluble Resin

The composition P1' may contain a water-soluble resin.

By including the water-soluble resin, the particle bodies are bonded (temporarily fixed) to one another in a region of the layer P1 where the ink P12 is not applied, and thus, undesirable scattering or the like of the particle bodies can be more effectively prevented. According to this, the safety for workers and the dimensional accuracy of the cellulosic member P10 to be produced can be further improved.

The water-soluble resin may be any as long as it is at least partially soluble in water, but is preferably, for example, a resin having a solubility in water at 25° C. (a mass soluble in 100 g of water) of 5 [g/100 g of water] or more, more preferably a resin having a solubility in water at 25° C. of 10 [g/100 g of water] or more.

Examples of the water-soluble resin include synthetic polymers such as polyvinyl alcohol (PVA), polyvinylpyrrolidone (PVP), polycaprolactone diol, sodium polyacrylate, polyacrylamide, modified polyamide, polyethylenimine, polyethylene oxide, and a random copolymer of ethylene oxide and propylene oxide; natural polymers such as corn starch, mannan, pectin, agar, alginic acid, dextran, glue, and gelatin; and semisynthetic polymers such as starch, oxidized starch, and modified starch, and one material or a combination of two or more materials selected from these can be used.

Examples of a water-soluble resin product include sodium starch phosphate ester (I) (Hosuta 5100, manufactured by Matsutani Chemical Industry Co., Ltd.), polyvinylpyrrolidone (PVP K-90, manufactured by Tokyo Chemical Industry Co., Ltd.), a copolymer of methyl vinyl ether/maleic anhydride (Gantrez AN-139, manufactured by GAF Corporation), polyacrylamide (manufactured by Wako Pure Chemical Industries, Ltd.), modified polyamide (modified nylon) (AQ nylon, manufactured by Toray Industries, Inc.), polyethylene oxide (PEO-1, manufactured by Seitetsu Kagaku Co., Ltd., Alkox, manufactured by Meisei Chemical Works, Ltd.), a random copolymer of ethylene oxide and propylene oxide (Alkox EP, manufactured by Meisei Chemical Works, Ltd.), sodium polyacrylate (manufactured by Wako Pure Chemical Industries, Ltd.), and a carboxyvinyl polymer/cross-linked acrylic water-soluble resin (Aqupec, manufactured by Sumitomo Seika Chemicals Co., Ltd.).

In particular, in the case where the water-soluble resin is polyvinyl alcohol, the mechanical strength of the cellulosic member P10 can be made particularly excellent. Further, by adjusting the degree of saponification or the degree of polymerization, the properties (for example, water solubility, water resistance, etc.) of the water-soluble resin and the properties (for example, viscosity, fixing force of particle bodies, wettability, etc.) of the composition P1' can be more favorably controlled. Due to this, polyvinyl alcohol can be more favorably applied to the production of a variety of cellulosic members P10. Further, polyvinyl alcohol is inexpensive and offers a stable supply among the various water-soluble resins. Due to this, while keeping the production cost low, the cellulosic member P10 can be stably produced.

In the case where the water-soluble resin contains polyvinyl alcohol, the degree of saponification of the polyvinyl alcohol is preferably 85 or more and 90 or less. According to this, a decrease in the solubility of polyvinyl alcohol in water can be prevented. Due to this, in the case where the composition P1' contains water, a decrease in the adhesiveness between adjacent layers P1 can be more effectively prevented.

In the case where the water-soluble resin contains polyvinyl alcohol, the degree of polymerization of the polyvinyl alcohol is preferably 300 or more and 1,000 or less. According to this, in the case where the composition P1' contains water, the mechanical strength of the respective layers P1 and the adhesiveness between adjacent layers P1 can be made particularly excellent.

Further, in the case where the water-soluble resin is polyvinylpyrrolidone (PVP), effects as described below are obtained. That is, polyvinylpyrrolidone has excellent adhesiveness to various materials such as a glass, a metal, and a plastic, and therefore, the strength, the stability of the shape of a region of the layer P1 to which the ink P12 is not applied can be made particularly excellent, and the dimensional accuracy of the finally obtained cellulosic member P10 can be made particularly excellent. Further, polyvinylpyrrolidone shows high solubility in water, and therefore, in an unbonded particle removal step (after completion of shaping), among the particle bodies constituting the respective layers P1, particle bodies which are not bonded to one another by the cellulose derivative can be easily and reliably removed. Further, polyvinylpyrrolidone has excellent affinity for various coloring agents, and therefore, in the case where the ink P12 containing a coloring agent is used in the ink application step, undesirable diffusion of the coloring agent can be effectively prevented. Further, in the case where the composition P1' in the form of a paste contains polyvinylpyrrolidone, the inclusion of bubbles in the composition P1' can be effectively prevented, and in the layer forming step, the occurrence of defects due to the inclusion of bubbles can be more effectively prevented.

In the case where the water-soluble resin contains polyvinylpyrrolidone, the weight average molecular weight of the polyvinylpyrrolidone is preferably 10,000 or more 1,700,000 or less, more preferably 30,000 or more 1,500,000 or less. According to this, the above-mentioned function can be more effectively exhibited.

Further, in the case where the water-soluble resin is polycaprolactone diol, the composition P1' can be favorably formed into pellets, and undesirable scattering or the like of the particle bodies can be more effectively prevented, and the handleability (ease of handling) of the composition P1' is improved, so that the safety for workers and the dimensional accuracy of the cellulosic member P10 to be produced can be improved. Further, melting can be achieved at a relatively low temperature, and thus, the energy and cost required for the production of the cellulosic member P10 can be kept low, and also the productivity of the cellulosic member P10 can be made sufficiently high.

In the case where the water-soluble resin contains polycaprolactone diol, the weight average molecular weight of the polycaprolactone diol is preferably 10,000 or more 1,700,000 or less, more preferably 30,000 or more 1,500,000 or less. According to this, the above-mentioned function can be more effectively exhibited.

In the composition P1', the water-soluble resin is preferably in a liquid state (for example, in a dissolved state, in a molten state, or the like) in at least the layer forming step. According to this, the uniformity of the thickness of the layer P1 to be formed using the composition P1' can be easily and reliably increased.

Other Particle Bodies

In either of the case where the cellulose derivative is contained in the form of particle bodies and the case where the cellulose derivative is contained in the form other than particle bodies, the composition P1' may contain particle bodies (other particle bodies) constituted by a material other than the cellulose derivative.

According to this, for example, the physical properties such as specific gravity, elasticity, and hardness of the cellulosic member P10 can be favorably adjusted.

Examples of a constituent material of the other particles bodies include an inorganic material, an organic material, and a composite of these materials.

Examples of the inorganic material constituting the other particles bodies include various metals and metal compounds. Examples of the metal compounds include various metal oxides such as silica, alumina, titanium oxide, zinc oxide, zirconium oxide, tin oxide, magnesium oxide, and potassium titanate; various metal hydroxides such as magnesium hydroxide, aluminum hydroxide, and calcium hydroxide; various metal nitrides such as silicon nitride, titanium nitride, and aluminum nitride; various metal carbides such as silicon carbide and titanium carbide; various metal sulfides such as zinc sulfide; carbonates of various metals such as calcium carbonate and magnesium carbonate; sulfates of various metals such as calcium sulfate and magnesium sulfate; silicates of various metals such as calcium silicate and magnesium silicate; phosphates of various metals such as calcium phosphate; borates of various metals such as aluminum borate and magnesium borate; and composites of these materials.

Examples of the organic material constituting the other particle bodies include synthetic resins and natural polymers, and more specific examples thereof include a polyethylene resin; polypropylene; polyethylene oxide; polypropylene oxide; polyethylenimine; polystyrene; polyurethane; polyurea; polyester; a silicone resin; an acrylic silicone resin; a polymer containing a (meth)acrylate ester as a constituent monomer such as poly(methyl methacrylate); a crosspolymer (an ethylene acrylic acid copolymer resin or the like) containing a (meth)acrylate ester as a constituent monomer such as a methyl methacrylate crosspolymer; polyamide resins such as nylon 12, nylon 6, and copolymer nylon; polyimide; gelatin; starch; chitin; and chitosan.

The other particle bodies may be subjected to a surface treatment such as a hydrophobization treatment or a hydrophilization treatment.

The average particle diameter of the other particle bodies is not particularly limited, but is preferably 1 µm or more and 25 µm or less, more preferably 1 µm or more and 15 µm or less. According to this, the mechanical strength of the cellulosic member P10 can be made particularly excellent, and also the occurrence of undesirable irregularities or the like in the cellulosic member P10 to be produced is more effectively prevented, and the dimensional accuracy of the cellulosic member P10 can be made particularly excellent. Further, the fluidity of the composition (three-dimensional shaping composition) P1' can be made particularly excellent, and thus, the productivity of the cellulosic member P10 can be made particularly excellent.

The Dmax of the other particle bodies is preferably 3 µm or more and 40 µm or less, more preferably 5 µm or more and 30 µm or less. According to this, the mechanical strength of the cellulosic member P10 can be made particularly excellent, and also the occurrence of undesirable irregularities or the like in the cellulosic member P10 to be produced is more effectively prevented, and the dimensional accuracy of the cellulosic member P10 can be made particularly excellent. Further, the fluidity of the composition (three-dimensional shaping composition) P1' can be made particularly excellent, and thus, the productivity of the cellulosic member P10 can be made particularly excellent.

The other particle bodies may have any shape, but preferably have a spherical shape. According to this, the fluidity of the composition (three-dimensional shaping composition) P1' can be made particularly excellent, and thus, the productivity of the cellulosic member P10 can be made particularly excellent, and also the occurrence of undesirable irregularities or the like in the cellulosic member P10 to be produced is more effectively prevented, and the dimensional accuracy of the cellulosic member P10 can be made particularly excellent.

The content of the three-dimensional shaping powder in the composition (three-dimensional shaping composition) P1' is preferably 1% by mass or more and 85% by mass or less, more preferably 2% by mass or more and 60% by mass or less. According to this, while making the fluidity of the composition (three-dimensional shaping composition) P1' sufficiently high, the mechanical strength of the finally obtained cellulosic member P10 can be made particularly excellent.

Another Solvent (Solvent other than Water)

The composition P1' may contain a solvent other than water (another solvent).

According to this, the fluidity and handleability (such as coatability) of the composition P1' can be further improved. In addition, solvent components including water can be more efficiently removed from the layer P1 to be formed using the composition P1' (by utilizing, for example, an azeotropic phenomenon). Accordingly, the productivity of the cellulosic member P10 can be made particularly excellent.

The another solvent is preferably a solvent miscible with water. According to this, the fluidity of the composition P1' can be made favorable, and an undesirable variation in the thickness of the layer P1 to be formed using the composition P1' can be more effectively prevented. Due to this, the occurrence of an undesirable variation in the mechanical strength among individual regions of the finally obtained cellulosic member P10 can be more effectively prevented, and thus, the reliability of the cellulosic member P10 can be made higher.

The another solvent is preferably a solvent which dissolves the water-soluble resin. According to this, the fluidity of the composition P1' can be made favorable, and an undesirable variation in the thickness of the layer P1 to be formed using the composition P1' can be more effectively prevented. Further, when the layer P1 in a state where the solvent is removed is formed, the water-soluble resin can be more highly uniformly adhered to the particle bodies throughout the entire layer P1, and thus, the occurrence of undesirable unevenness of the composition can be more effectively prevented. Due to this, the occurrence of an undesirable variation in the mechanical strength among individual regions of the finally obtained cellulosic member P10 can be more effectively prevented, and thus, the reliability of the cellulosic member P10 can be made higher.

Examples of the solvent constituting the composition P1' include alcoholic solvents such as methanol, ethanol, and isopropanol; ketone-based solvents such as methyl ethyl ketone and acetone; glycol ether-based solvents such as ethylene glycol monoethyl ether and ethylene glycol monobutyl ether; glycol ether acetate-based solvents such as propylene glycol 1-monomethyl ether 2-acetate and propylene glycol 1-monoethyl ether 2-acetate; polyethylene glycol, and polypropylene glycol, and one solvent or a combination of two or more solvents selected from these can be used.

In the case where the composition P1' contains a solvent, the content of the solvent in the composition P1' is preferably 1% by mass or more and 50% by mass or less, more preferably 2% by mass or more and 40% by mass or less. According to this, the effect of including the solvent as mentioned above is more remarkably exhibited, and also the solvent can be easily removed in a short time in the production process for the cellulosic member P10, and thus, it is advantageous from the viewpoint of improvement of the productivity of the cellulosic member P10.

The solvent is preferably removed from the composition P1' constituting the layer P1 before the ink P12 is applied. According to this, the stability of the shape of the layer P1 is improved, and also even if the solvent has low affinity for the constituent material of the ink P12, undesirable repelling of the ink P12 from the layer P1 or the like can be effectively prevented, and thus, the ink P12 can be easily and reliably applied to the layer P1 in a desired pattern.

In the case where the solvent constituting the composition P1' is removed from the composition P1' constituting the layer P1 before the ink P12 is applied, the solvent may be completely removed from the layer P1, or may be partially removed from the layer P1. Even in such a case, the effect as mentioned above is exhibited.

Another Component

The composition P1' may contain a component other than the above-mentioned components. Examples of such a component include a polymerization initiator, a polymerization accelerator, a crosslinking agent, a siloxane compound, a reducing agent, a permeation accelerator, a wetting agent (a humectant), a fixing agent, an antifungal agent, a preservative, an antioxidant, a UV absorbing agent, a chelating agent, and a pH adjusting agent.

Third Embodiment

In the production method of the third embodiment, as the materials for producing the three-dimensionally shaped article, the tangible part forming ink P16' and the support section forming ink P17' are used.

Tangible Part Forming Ink P16'

Hereinafter, the tangible part forming ink P16' to be used in the production method of the third embodiment mentioned above will be described in detail.

The tangible part forming ink P16' is the cellulosic material (cellulosic composition) according to the invention, and contains the cellulose derivative having the oxidizable/reducible functional group introduced thereinto.

In particular, in this embodiment, the tangible part forming ink P16' contains water and the cellulose derivative having the oxidizable/reducible functional group in an oxidized state introduced thereinto.

According to this, while making the handleability (for example, the ejection stability by an inkjet method, etc.) of the tangible part forming ink P16' excellent, the cellulosic member P10 to be produced sufficiently exhibits the advantageous characteristics intrinsically possessed by cellulose (for example, high strength, lightweight, biosafety, environmental safety, etc.), and thus has excellent mechanical strength, durability, reliability, and the like.

Cellulose Derivative

The cellulose derivative contained in the tangible part forming ink P16' preferably satisfies the conditions as mentioned above.

In the tangible part forming ink P16', the cellulose derivative is preferably dissolved in water.

According to this, an undesirable variation in the composition in the tangible part forming ink P16' can be effectively prevented. Further, for example, the ejection stability and the like of the tangible part forming ink P16' by an inkjet method can be made particularly excellent. As a result, the cellulosic member P10 can be stably produced over a long period of time.

The content of the cellulose derivative in the tangible part forming ink P16' is not particularly limited, but is preferably 30% by mass or more, more preferably 40% by mass or more and 90% by mass or less, further more preferably 45% by mass or more and 85% by mass or less with respect to the total content of solid components contained in the tangible part forming ink P16' (all the components to be contained in the cellulosic member P10).

According to this, while making the storage stability, ejection stability, and the like of the tangible part forming ink P16' excellent, the durability, strength, and reliability of the cellulosic member P10 to be produced can be made particularly excellent.

In the tangible part forming ink P16', the cellulose derivative may be in a dissolved state or in a dispersed state or in a mixed state of these states.

In the case where the cellulose derivative is dispersed in the tangible part forming ink P16', the average particle diameter of the cellulose derivative in the tangible part forming ink P16' is not particularly limited, but is preferably 5.0 µm or less, more preferably 1.0 µm or less.

According to this, while making the storage stability, ejection stability, and the like of the tangible part forming ink P16' excellent, the durability, strength, and reliability of the cellulosic member P10 to be produced can be made particularly excellent.

Water

The tangible part forming ink P16' contains water in addition to the cellulose derivative as mentioned above.

According to this, the fluidity of the tangible part forming ink P16' can be made excellent, and thus, the application of the tangible part forming ink P16' by an inkjet method can be favorably performed.

The content of water in the tangible part forming ink P16' is not particularly limited, but is preferably 10% by mass or more and 70% by mass or less, more preferably 20% by mass or more and 50% by mass or less.

According to this, while making the ejection stability of the tangible part forming ink P16' more excellent, the solvent can be removed more rapidly after the tangible part forming ink P16' is applied, and therefore, the productivity of the cellulosic member P10 can be made particularly excellent.

Another Binding Agent

The cellulose derivative functions as a binding agent, and according to this, the mechanical strength and the like of the cellulosic member P10 can be made excellent, however, the tangible part forming ink P16' may further contain another binding agent.

Examples of the binding agent include a thermoplastic resin; a thermosetting resin; various photocurable resins such as a visible light curable resin which is cured by a light in the visible light range (a photocurable resin in a narrow sense), a UV curable resin, and an IR curable resin; and an X-ray curable resin, and one binding agent or a combination of two or more binding agents selected from these can be used. Above all, from the viewpoint of the mechanical strength of the cellulosic member P10 to be obtained, the productivity of the cellulosic member P10, and the like, the binding agent is preferably a binding agent containing a curable resin. Further, among the various curable resins, from the viewpoint of the mechanical strength of the cellulosic member P10 to be obtained, the productivity of the cellulosic member P10, the storage stability of the binding agent, and the like, particularly, a UV curable resin (a polymerizable compound) is preferred.

As the UV curable resin (polymerizable compound), a compound whose addition polymerization or ring-opening polymerization is initiated by a radical species, a cationic species, or the like generated from a photopolymerization initiator by UV irradiation, thereby forming a polymer is preferably used. Examples of the polymerization form of the addition polymerization include radical, cationic, anionic, metathesis, and coordination polymerization. Further, examples of the polymerization form of the ring-opening polymerization include cationic, anionic, radical, metathesis, and coordination polymerization.

Examples of the addition polymerizable compound include compounds having at least one ethylenically unsaturated double bond. As the addition polymerizable compound, a compound having at least one, preferably two or more terminal ethylenically unsaturated bonds can be preferably used.

An ethylenically unsaturated polymerizable compound has a chemical form of a monofunctional polymerizable compound, a polyfunctional polymerizable compound, or a mixture of these compounds. Examples of the monofunctional polymerizable compound include unsaturated carboxylic acids (for example, acrylic acid, methacrylic acid, itaconic acid, crotonic acid, isocrotonic acid, maleic acid, etc.) and esters thereof, and amides thereof. As the polyfunctional polymerizable compound, an ester of an unsaturated carboxylic acid with an aliphatic polyhydric alcohol compound or an amide of an unsaturated carboxylic acid with an aliphatic polyvalent amine compound is used.

Further, an addition reaction product of an ester or an amide of an unsaturated carboxylic acid having a hydroxyl group or a nucleophilic substituent such as an amino group or a mercapto group with an isocyanate or an epoxy, a dehydration condensation reaction product with a carboxylic acid, or the like can also be used. Further, an addition reaction product of an ester or an amide of an unsaturated carboxylic acid having an electrophilic substituent such as an isocyanate group or an epoxy group with an alcohol, an amine, or a thiol, further, a substitution reaction product of an ester or an amide of an unsaturated carboxylic acid having a leaving substituent such as a halogen group or a tosyloxy group with an alcohol, an amine, or a thiol can also be used.

For example, a (meth)acrylate ester is representative of a specific example of the radical polymerizable compound which is the ester of an unsaturated carboxylic acid with an aliphatic polyhydric alcohol compound, and either of a monofunctional (meth)acrylate and a polyfunctional (meth)acrylate can be used.

Specific examples of the monofunctional (meth)acrylate include tolyloxyethyl (meth)acrylate, phenyloxyethyl (meth)acrylate, cyclohexyl (meth)acrylate, ethyl (meth)acrylate, methyl (meth)acrylate, isobornyl (meth)acrylate, and tetrahydrofurfuryl (meth)acrylate.

Specific examples of a difunctional (meth)acrylate include ethylene glycol di(meth)acrylate, triethylene glycol di(meth)acrylate, 1,3-butanediol di(meth)acrylate, tetramethylene glycol di(meth)acrylate, propylene glycol di(meth)acrylate, neopentyl glycol di(meth)acrylate, hexanediol di(meth)acrylate, 1,4-cyclohexanediol di(meth)acrylate, tetraethylene glycol di(meth)acrylate, pentaerythritol di(meth)acrylate, and dipentaerythritol di(meth)acrylate.

Specific examples of a trifunctional (meth)acrylate include trimethylolpropane tri(meth)acrylate, trimethylolethane tri(meth)acrylate, alkylene oxide-modified tri(meth)acrylate of trimethylolpropane, pentaerythritol tri(meth)acrylate, dipentaerythritol tri(meth)acrylate, trimethylolpropane tri((meth)acryloyloxypropyl) ether, isocyanuric acid alkylene oxide-modified tri(meth)acrylate, propionic acid dipentaerythritol tri(meth)acrylate, tri((meth)acryloyloxyethyl) isocyanurate, hydroxypivalaldehyde-modified dimethylolpropane tri(meth)acrylate, and sorbitol tri(meth)acrylate.

Specific examples of a tetrafunctional (meth)acrylate include pentaerythritol tetra(meth)acrylate, sorbitol tetra(meth)acrylate, ditrimethylolpropane tetra(meth)acrylate, propionic acid dipentaerythritol tetra(meth)acrylate, and ethoxylated pentaerythritol tetra(meth)acrylate.

Specific examples of a pentafunctional (meth)acrylate include sorbitol penta(meth)acrylate and dipentaerythritol penta(meth)acrylate.

Specific examples of a hexafunctional (meth)acrylate include dipentaerythritol hexa(meth)acrylate, sorbitol hexa(meth)acrylate, alkylene oxide-modified hexa(meth)acrylate of phosphazene, and caprolactone-modified dipentaerythritol hexa(meth)acrylate.

Examples of the polymerizable compound other than (meth)acrylates include itaconate esters, crotonate esters, isocrotonate esters, and maleate esters.

Examples of the itaconate esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of the crotonate esters include ethylene glycol dicrotonate, tetramethylene glycol dicrotonate, pentaerythritol dicrotonate, and sorbitol tetradicrotonate.

Examples of the isocrotonate esters include ethylene glycol diisocrotonate, pentaerythritol diisocrotonate, and sorbitol tetraisocrotonate.

Examples of the maleate esters include ethylene glycol dimaleate, triethylene glycol dimaleate, pentaerythritol dimaleate, and sorbitol tetramaleate.

As an example of another ester, for example, an aliphatic alcohol ester, an ester having an aromatic backbone, an ester containing an amino group, or the like can also be used.

Specific examples of a monomer of the amide of an unsaturated carboxylic acid with an aliphatic polyvalent amine compound include methylenebis-acrylamide, methylenebis-methacrylamide, 1,6-hexamethylenebis-acrylamide, 1,6-hexamethylenebis-methacrylamide, diethylenetriamine trisacrylamide, xylylene bisacrylamide, and xylylene bismethacrylamide.

Other preferred examples of an amide-based monomer include monomers having a cyclohexylene structure.

A urethane-based addition polymerizable compound produced by an addition reaction between an isocyanate and a hydroxy group is also preferred, and specific examples of such a compound include vinyl urethane compounds containing two or more polymerizable vinyl groups in one molecule obtained by adding a vinyl monomer containing a hydroxy group represented by the following formula (1) to a polyisocyanate compound having two or more isocyanate groups in one molecule.

$$CH_2=C(R^1)COOCH_2CH(R^2)OH \qquad (1)$$

In the formula (1), $R^1$ and $R^2$ each independently represent H or $CH_3$.

In the invention, a cationic ring-opening polymerizable compound having at least one cyclic ether group such as an epoxy group or an oxetane group in the molecule can be favorably used as a UV curable resin (a polymerizable compound).

Examples of the cationic polymerizable compound include curable compounds containing a ring-opening polymerizable group, and among these, heterocyclic group-containing curable compounds are particularly preferred. Examples of such curable compounds include cyclic imino ethers such as epoxy derivatives, oxetane derivatives, tetrahydrofuran derivatives, cyclic lactone derivatives, cyclic carbonate derivatives, and oxazoline derivatives, and vinyl ethers, and among these, epoxy derivatives, oxetane derivatives, and vinyl ethers are preferred.

Preferred examples of the epoxy derivatives include monofunctional glycidyl ethers, polyfunctional glycidyl ethers, monofunctional alicyclic epoxies, and polyfunctional alicyclic epoxies.

Specific examples of compounds of the glycidyl ethers include diglycidyl ethers, (for example, ethylene glycol diglycidyl ether, bisphenol A diglycidyl ether, etc.), trifunctional or higher functional glycidyl ethers (for example, trimethylolethane triglycidyl ether, trimethylolpropane triglycidyl ether, glycerol triglycidyl ether, triglycidyl trishydroxyethyl isocyanurate, etc.), tetrafunctional or higher functional glycidyl ethers (for example, sorbitol tetraglycidyl ether, pentaerythritol tetraglycyl ether, polyglycidyl ethers of cresol novolac resins, polyglycidyl ethers of phenolnovolac resins, etc.), alicyclic epoxies (for example, Celloxide 2021P, Celloxide 2081, Epolead GT-301, and Epolead GT-401 (all are manufactured by Daicel Chemical Industries, Ltd.)), EHPE (manufactured by Daicel Chemical Industries, Ltd.), polycyclohexyl epoxy methyl ethers of phenol novolac resins, etc.), and oxetanes (for example, OX-SQ and PNOX-1009 (all are manufactured by Toagosei Co., Ltd.), etc.).

As the polymerizable compound, an alicyclic epoxy derivative can be preferably used. An "alicyclic epoxy group" refers to a partial structure in which a double bond of a cycloalkene ring of a cyclopentene group, a cyclohexene group, or the like is epoxidized with a suitable oxidizing agent such as hydrogen peroxide or a peroxy acid.

As the alicyclic epoxy compound, a polyfunctional alicyclic epoxy compound having two or more cyclohexene oxide groups or cyclopentene oxide groups in one molecule is preferred. Specific examples of the alicyclic epoxy compound include 4-vinylcyclohexene dioxide, (3,4-epoxycyclohexyl)methyl-3,4-epoxycyclohexylcarboxylate, di(3,4-epoxycyclohexyl) adipate, di(3,4-epoxycyclohexylmethyl) adipate, bis(2,3-epoxycyclopentyl) ether, di(2,3-epoxy-6-methylcyclohexylmethyl) adipate, and dicyclopentadiene dioxide.

A normal glycidyl compound having an epoxy group but having no alicyclic structure in the molecule can be used alone or can also be used in combination with the above-mentioned alicyclic epoxy compound.

Examples of such a normal glycidyl compound include a glycidyl ether compound and a glycidyl ester compound, but it is preferred to use a glycidyl ether compound in combination.

Specific examples of the glycidyl ether compound include aromatic glycidyl ether compounds such as 1,3-bis(2,3-epoxypropyloxy)benzene, a bisphenol A type epoxy resin, a bisphenol F type epoxy resin, a phenol novolac type epoxy resin, a cresol novolac type epoxy resin, and a trisphenol methane type epoxy resin; and aliphatic glycidyl ether compounds such as 1,4-butanediol glycidyl ether, glycerol triglycidyl ether, propylene glycol diglycidyl ether, and trimethylolpropane tritriglycidyl ether. Examples of the glycidyl ester include glycidyl esters of linoleic acid dimers.

As the polymerizable compound, a compound having an oxetanyl group, which is a four-membered cyclic ether (hereinafter also simply referred to as "oxetane compound") can be used. The oxetanyl group-containing compound is a compound having one or more oxetanyl groups in one molecule.

The content of the binding agent in the tangible part forming ink P16' is preferably 80% by mass or more, more preferably 85% by mass or more. According to this, the mechanical strength of the finally obtained cellulosic member P10 can be made particularly excellent.

Another Component

The tangible part forming ink P16' may contain a component (another component) other than the above-mentioned components.

As the another component to be contained in the tangible part forming ink P16', the same component as the another component described as the constituent component of the ink P12 in the first embodiment can be used, and a component which satisfies the conditions as mentioned above is preferred. According to this, the same effect as mentioned above is obtained.

The viscosity of the tangible part forming ink P16' is preferably 10 mPa·s or more and 30 mPa·s or less, more preferably 15 mPa·s or more and 25 mPa·s or less.

According to this, the ejection stability of the tangible part forming ink P16' by an inkjet method can be made particularly excellent.

Support Section Forming Ink P17'

Hereinafter, the support section forming ink P17' to be used in the production method of the third embodiment mentioned above will be described in detail.

The support section forming ink P17' contains at least a curable resin (a curable component).

Curable Resin

Examples of the curable resin (curable component) constituting the support section forming ink P17' include the same curable resins (curable components) as those exemplified as the constituent component (another binding agent) of the tangible part forming ink P16'.

In the case where the tangible part forming ink P16' contains a curable resin as the another binding agent, it is preferred to cure the curable resin (curable component) constituting the support section forming ink P17' and the curable resin (another binding agent) constituting the tangible part forming ink P16' mentioned above by the same type of energy ray.

According to this, the structure of the cellulosic member production device can be effectively prevented from complicating, and thus, the productivity of the cellulosic member P10 can be made particularly excellent. Further, the surface shape of the cellulosic member P10 can be more reliably controlled.

The support section forming ink P17' preferably contains one or more curable components particularly selected from the group consisting of tetrahydrofurfuryl (meth)acrylate, ethoxyethoxyethyl (meth)acrylate, polyethylene glycol di(meth)acrylate, and (meth)acryloyl morpholine among various curable components.

According to this, while more reliably making the appearance of the cellulosic member P10 excellent, the productivity of the cellulosic member P10 can be made particularly excellent.

Further, the mechanical strength and the stability of the shape of the support section P17 to be formed by curing the support section forming ink P17' can be made particularly excellent. As a result, when producing the cellulosic member P10, the support section P17 of the lower layer (first layer) can more favorably support the tangible part forming ink P16' for forming the upper layer (second layer). Due to this, undesirable deformation (particularly, sagging or the like) of the tangible part P16 can be more favorably prevented, and thus, the dimensional accuracy of the finally obtained cellulosic member P10 can be made particularly excellent.

In particular, when the support section forming ink P17' contains (meth)acryloyl morpholine, an effect as described below is obtained.

That is, when (meth)acryloyl morpholine is in a state of being not completely cured (a polymer of (meth)acryloyl morpholine in a state of being not completely cured) even if a curing reaction has proceeded, (meth)acryloyl morpholine has high solubility in various solvents such as water. Therefore, in the support section removal step as mentioned above, while more effectively preventing the occurrence of defects in the tangible part P16, the support section P17 can be selectively and reliably, and also efficiently removed. As a result, the cellulosic member P10 having a desired form can be obtained with high productivity and higher reliability.

Further, when the support section forming ink P17' contains tetrahydrofurfuryl (meth)acrylate, the flexibility after curing can be maintained more favorably, and in a treatment with a liquid for removing the support section P17, the support section P17 is more easily formed into a gel, and therefore, the efficiency of removal of the support section P17 can be further enhanced.

Further, when the support section forming ink P17' contains ethoxyethoxyethyl (meth)acrylate, in a treatment with a liquid for removing the support section P17, the efficiency of removal of the support section P17 can be further enhanced.

Further, when the support section forming ink P17' contains polyethylene glycol di(meth)acrylate, in the case where a liquid for removing the support section P17 contains water as a main component, the solubility of the support section P17 in the liquid is increased, and thus, the support section P17 can be more easily removed.

The content of the curable component in the support section forming ink P17' is preferably 83% by mass or more and 98.5% by mass or less, more preferably 87% by mass or more and 95.4% by mass or less.

According to this, the stability of the shape of the support section P17 to be formed can be made particularly excellent, and in the case where the layers P1 are stacked when producing the cellulosic member P10, undesirable deformation of the layer P1 on the lower side can be more effectively prevented, and the layer P1 on the upper side can be favorably supported. As a result, the dimensional accuracy of the finally obtained cellulosic member P10 can be made particularly excellent. Further, the productivity of the cellulosic member P10 can be made particularly excellent.

Polymerization Initiator

The support section forming ink P17' preferably contains a polymerization initiator.

According to this, the curing speed of the support section forming ink P17' when producing the cellulosic member P10 can be moderately increased, and thus, the productivity of the cellulosic member P10 can be made particularly excellent.

Further, the stability of the shape of the support section P17 to be formed can be made particularly excellent, and in the case where the layers P1 are stacked when producing the cellulosic member P10, undesirable deformation of the layer P1 on the lower side can be more effectively prevented, and the layer P1 on the upper side can be favorably supported. As a result, the dimensional accuracy of the finally obtained cellulosic member P10 can be made particularly excellent.

Examples of the polymerization initiator constituting the support section forming ink P17' include the same polymerization initiators as those exemplified as the constituent component of the tangible part forming ink P16'.

In particular, the support section forming ink P17' preferably contains bis(2,4,6-trimethylbenzoyl)-phenylphosphine oxide and/or 2,4,6-trimethylbenzoyl-diphenyl-phosphine oxide as the polymerization initiator.

By including such a polymerization initiator, while more reliably making the properties of the surface of the tangible part P16 (the tangible part P16 which is formed using the tangible part forming ink P16') which is formed in contact with the support section P17 (the support section P17 which is formed using the support section forming ink P17') favorable, and also while more reliably making the appearance of the cellulosic member P10 excellent, the productivity of the cellulosic member P10 can be made particularly excellent.

In addition, the mechanical strength and the stability of the shape of the support section P17 to be formed by curing the support section forming ink P17' can be made particularly excellent. As a result, when producing the cellulosic member P10, the support section P17 of the lower layer (first layer) can more favorably support the tangible part forming ink P16' for forming the upper layer (second layer). Due to this, undesirable deformation (particularly, sagging or the like) of the tangible part P16 can be more favorably prevented, and thus, the dimensional accuracy of the finally obtained cellulosic member P10 can be made particularly excellent.

A specific value of the content of the polymerization initiator in the support section forming ink P17' is preferably 1.5% by mass or more and 17% by mass or less, more preferably 4.6% by mass or more and 13% by mass or less.

According to this, while more reliably making the appearance of the cellulosic member P10 excellent, the productivity of the cellulosic member P10 can be made particularly excellent.

Further, the mechanical strength and the stability of the shape of the support section P17 to be formed by curing the support section forming ink P17' can be made particularly excellent. As a result, when producing the cellulosic member P10, the support section P17 of the lower layer (first layer) can more favorably support the tangible part forming ink P16' for forming the upper layer (second layer). Due to this, undesirable deformation (particularly, sagging or the like) of the tangible part P16 can be more favorably prevented, and thus, the dimensional accuracy of the finally obtained cellulosic member P10 can be made particularly excellent.

Another Component

The support section forming ink P17' may contain a component other than the above-mentioned components. Examples of such a component include various coloring agents such as a pigment and a dye, a dispersant, a surfactant, a sensitizer, a polymerization accelerator, a solvent, a permeation accelerator, a wetting agent (a humectant), a fixing agent, an antifungal agent, a preservative, an antioxidant, a UV absorbing agent, a chelating agent, a pH adjusting agent, a thickening agent, a filler, an anti-aggregation agent, and a defoaming agent.

In particular, by including a coloring agent in the support section forming ink P17', the visibility of the support section P17 is improved, and in the finally obtained cellulosic member P10, at least a part of the support section P17 can be more reliably prevented from being undesirably left.

Examples of the coloring agent constituting the support section forming ink P17' include the same coloring agents as those exemplified as the constituent component of the tangible part forming ink P16', however, the coloring agent is preferably a coloring agent which gives a color different from the color of the tangible part P16 (a color of the cellulosic member P10 to be visually recognized in appearance) superimposed on the support section P17 formed using the support section forming ink P17' when observed from the normal direction of the surface of the cellulosic member P10. According to this, the effect as mentioned above is more remarkably exhibited.

In the case where the support section forming ink P17' contains a pigment, if the support section forming ink P17' further contains a dispersant, the dispersibility of the pigment can be made more favorable. Examples of the dispersant constituting the support section forming ink P17' include the same dispersants as those exemplified as the constituent component of the tangible part forming ink P16'.

The viscosity of the support section forming ink P17' is preferably 10 mPa·s or more and 30 mPa·s or less, more preferably 15 mPa·s or more and 25 mPa·s or less.

According to this, the ejection stability of the support section forming ink P17' by an inkjet method can be made particularly excellent.

In the production of the cellulosic member P10, multiple types of support section forming inks P17' may be used.

In the invention, as the ink for forming the tangible part as mentioned above, multiple types of inks may be used.

For example, an ink which contains a coloring agent (a color ink) and an ink which does not contain a coloring agent (a clear ink) may be used. According to this, for example, as an ink to be applied to a region which has an effect on the color tone in appearance of the cellulosic member P10, an ink which contains a coloring agent is used, and as an ink to be applied to a region which does not have an effect on the color tone in appearance of the cellulosic member P10, an ink which does not contain a coloring agent can be used.

In addition, for example, multiple types of inks containing a coloring agent having a different composition may be used. According to this, by using these inks in combination, an expressible color reproduction range can be widened.

In the case where multiple types of inks are used, it is preferred to use at least a cyan ink, a magenta ink, and a yellow ink. According to this, by using these inks in combination, an expressible color reproduction range can be further widened.

Further, for example, by using multiple types of inks having a different type of the cellulose derivative or a different content of the cellulose derivative, the properties such as rigidity or elasticity required for individual regions of the cellulosic member P10 can be favorably adjusted.

Hereinabove, preferred embodiments of the invention have been described, however, the invention is not limited thereto.

For example, in the above-mentioned embodiments, a case where a squeegee is used as the flattening unit has been mainly described, however, a roller or the like may be used in place of the squeegee.

Further, the production device to be used for producing the cellulosic member according to the invention may include a recovery mechanism (not shown) for recovering the composition which is not used for forming the layer in the composition supplied from the composition supply section. According to this, while preventing the accumulation of the excess composition in a region where the layer is formed, a sufficient amount of the composition can be supplied, and therefore, the occurrence of defects in the layer is more effectively prevented, and the cellulosic member can be more stably produced. Further, the recovered composition can be used for producing the cellulosic member again, and therefore, this can contribute to the reduction in the production cost of the cellulosic member, so that this configuration is preferred also from the viewpoint of resource saving.

Further, the production device to be used for producing the cellulosic member according to the invention may include a recovery mechanism for recovering the composition removed in the unbonded particle removal step.

Further, in the above-mentioned embodiments, a case where the tangible part is formed in all the layers has been described, however, the tangible part may not be formed in some layers. For example, the tangible part is not formed in a layer formed immediately above the stage, and the layer may be made to function as a sacrifice layer.

Further, in the above-mentioned embodiments, a case where the ink application step is performed by an inkjet method has been mainly described, however, the ink application step may be performed using another method (for example, another printing method).

Further, the tangible part forming ink and the support section forming ink may be applied by a method other than the inkjet method (for example, another printing method).

In the invention, the cellulosic material containing the cellulose derivative as mentioned above may be used for forming at least a part of the tangible part of the cellulosic member, and the tangible part may have a region which is formed without using the cellulosic material containing the cellulose derivative.

Further, in the production of the cellulosic member according to the invention, a pre-treatment step, an intermediate treatment step, or a post-treatment step may be performed as needed.

Examples of the pre-treatment step include a stage cleaning step.

As the intermediate treatment step, for example, in the case where the three-dimensional shaping composition is in the form of pellets, a step of stopping heating (a water-soluble resin solidification step) or the like may be included between the layer forming step and the ink application step. According to this, the water-soluble resin becomes in a solid state, and the layer can be obtained as a layer in which the bonding strength between the particle bodies is higher. Further, for example, in the case where the three-dimensional shaping composition contains a solvent component (a dispersion medium) such as water, a solvent component removal step in which the solvent component is removed may be included between the layer forming step and the ink application step. According to this, the layer forming step can be more smoothly performed, and an undesirable variation in the thickness of the layer to be formed can be more effectively prevented. As a result, the cellulosic member having higher dimensional accuracy can be produced with higher productivity.

Examples of the post-treatment step include a washing step, a shape adjustment step in which a bur is removed, a coloring step, and a coating layer forming step.

Further, in the production of the cellulosic member according to the invention, among the above-mentioned respective steps, the order of some steps may be changed.

Further, in the above-mentioned embodiments, a case where the flattening unit moves on the stage has been described, however, the flattening may be performed by moving the stage so as to change the positional relationship between the stage and the squeegee.

Further, in the above-mentioned embodiments of the production method, a case where in addition to the layer forming step and the ink application step, the reduction step is also performed repeatedly along with the layer forming step and the ink application step has been described, however, the reduction step may not be performed repeatedly. For example, after forming a stacked body including multiple layers which are not subjected to a reduction treatment for reducing the cellulose derivative, the multiple layers are subjected to the reduction treatment all together.

According to this, for example, an energy to be applied in the reduction treatment of the cellulose derivative can be reduced, and therefore, even in the case of using a material having low resistance to the energy in the production of the cellulosic member, undesirable denaturation, deterioration, or the like by application of the energy can be effectively prevented.

In this case, the reduction step may be performed either before or after the unbonded particle removal step.

Further, in the above-mentioned embodiments of the production method, a case where the cellulose derivative having an oxidizable/reducible functional group in an oxidized state (a cellulosic material) is used, and the oxidizable/reducible functional group is reduced in the production process for the cellulosic member has been representatively described, however, in the invention, the cellulosic material to be used in the production of the cellulosic member may contain a cellulose derivative having an oxidizable/reducible functional group in a reduced state. Further, a reduction reaction or an oxidation reaction may not be performed in the production process for the cellulosic member.

Further, in the invention, another reaction may be performed in the production process for the cellulosic member. For example, the cellulose derivative has a reactive functional group which contributes to a crosslinking reaction or a polymerization reaction, and in the production process for the cellulosic member, the crosslinking reaction or the polymerization reaction to which the reactive functional group contributes may be performed. According to this, for example, the mechanical strength, durability, reliability, and the like of the cellulosic member can be made particularly excellent.

Further, the cellulosic member according to the invention may be any as long as it is produced using the cellulosic material according to the invention, and may not be produced using the above-mentioned method or device.

Further, in the above-mentioned embodiments, an ink has been mainly described as the form of the cellulosic material (cellulosic composition) according to the invention, however, the cellulosic material (cellulosic composition) according to the invention may be in a form other than the ink.

What is claimed is:

1. A cellulosic material comprising a cellulose derivative, wherein the cellulose derivative has a functional group capable of reversibly performing a redox reaction introduced thereinto, wherein an HLB value of the cellulose derivative in which the functional group is in an oxidized state is represented by X1, and an HLB value of the cellulose derivative in which the functional group is in a reduced state is represented by X2 wherein X1−X2≥13.

2. The cellulosic material according to claim 1, wherein the cellulose derivative has at least one of a ferrocene structure or a viologen structure as the functional group.

3. An article, which is produced using the cellulosic material according to claim 2.

4. A recorded material, comprising the article according to claim 3 and an ink fixed to the article.

5. The cellulosic material according to claim 1, wherein the cellulose derivative has the functional group introduced into a cellulose backbone structure through a double bond.

6. An article, which is produced using the cellulosic material according to claim 5.

7. The cellulosic material according to claim 1, wherein when the HLB value of the cellulose derivative in which the functional group is in an oxidized state is represented by X1 and the HLB value of the cellulose derivative in which the functional group is in a reduced state is represented by X2, the following relation is satisfied: X1−X2≥18.

8. An article, which is produced using the cellulosic material according to claim 7.

9. An article, which is produced using the cellulosic material according to claim 1.

10. The article, according to claim 9, wherein the article is a recording medium, and is capable of releasing a fixed state of an ink by performing a redox reaction of the cellulose derivative after the ink is once fixed to the recording medium.

11. The cellulosic material according to claim 1, wherein the cellulose derivative has a ferrocene structure as the functional group.

12. The cellulosic material according to claim 1, wherein X1 is 16 or more.

13. The cellulosic material according to claim 1, wherein X1 is 19 or more.

14. The cellulosic material according to claim 1, wherein X2 is 3 or less.

15. The cellulosic material according to claim 1, wherein X2 is 1 or less.

16. The cellulosic material according to claim 1, wherein the cellulosic material has the following structure:

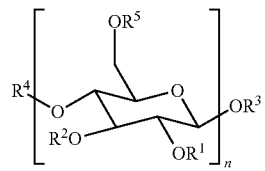

wherein n is an integer of 2 or more, and each of $R^1$, $R^2$, $R^4$, and $R^5$ independently represent a hydrogen atom or a substituent, and wherein $R^3$ represents the functional group capable of reversibly performing a redox reaction.

17. The cellulosic material according to claim 1, wherein the cellulosic material has the following structure:

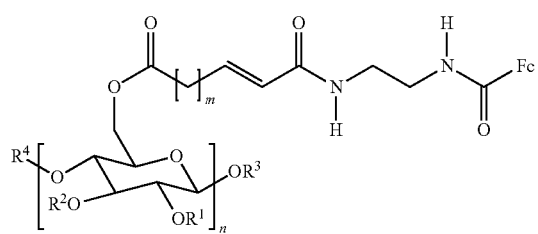

wherein n is an integer of 2 or more, m is an integer of 1 or more, and each of $R^1$, $R^2$, $R^4$, and $R^5$ independently represent a hydrogen atom or an acetyl group, and wherein Fc represents a ferrocene structure.

18. The cellulosic material according to claim 1, wherein the cellulosic material has the following structure:

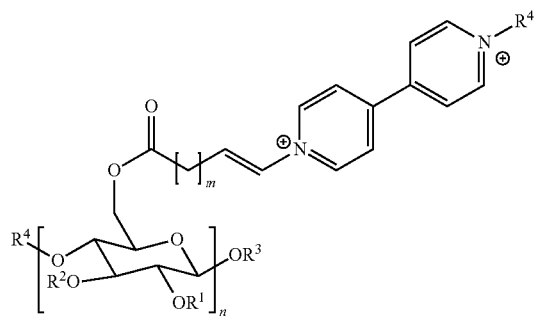

wherein n is an integer of 2 or more, m is an integer of 1 or more, and each of $R^1$, $R^2$, $R^4$, and $R^5$ independently represent a hydrogen atom or an acetyl group, and $R^6$ represents a hydrocarbon group having from 1 to 6 carbon atoms.

19. The cellulosic material according to claim 1, wherein the cellulose derivative has a viologen structure as the functional group.

20. A cellulosic material comprising a cellulose derivative, wherein the cellulose derivative has a functional group capable of reversibly performing a redox reaction introduced thereinto, the functional group comprising at least one of a ferrocene structure or a viologen structure.

* * * * *